US012776899B2

(12) United States Patent
Hill et al.

(10) Patent No.: US 12,776,899 B2
(45) Date of Patent: Oct. 27, 2026

(54) POST-QUANTUM SECURE MEDIA ACCESS CONTROL SECURITY (MACSEC) PRE-SHARED KEY AUTO-REFRESH

(71) Applicant: Cisco Technology, Inc., San Jose, CA (US)

(72) Inventors: Craig Thomas Hill, Sterling, VA (US); Chennakesava Reddy Gaddam, Bangalore (IN); Annu Singh, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 19/058,525

(22) Filed: Feb. 20, 2025

(65) Prior Publication Data

US 2026/0081767 A1 Mar. 19, 2026

(30) Foreign Application Priority Data

Sep. 13, 2024 (IN) ............................ 202441069579

(51) Int. Cl.
*H04L 9/08* (2006.01)
*H04L 9/32* (2006.01)
(Continued)

(52) U.S. Cl.
CPC .......... *H04L 9/0852* (2013.01); *H04L 9/0838* (2013.01); *H04L 9/3242* (2013.01)

(58) Field of Classification Search
None
See application file for complete search history.

(56) References Cited

U.S. PATENT DOCUMENTS 11,956,351 B1 4/2024 Wang et al.
12,200,122 B1 * 1/2025 Pala ..................... H04L 63/062
(Continued)

FOREIGN PATENT DOCUMENTS

CN 117527202 A * 2/2024 ........... H04L 9/0838
CN 120602932 A * 9/2025 ........ H04W 12/0431

OTHER PUBLICATIONS

The Evolutionof Quantum Key Distribution Networks:On the Road to the Qinternet. Cao et al. (Year: 2022).*
(Continued)

*Primary Examiner* — Venkat Perungavoor
(74) *Attorney, Agent, or Firm* — Lee & Hayes, P.C.

(57) ABSTRACT

Techniques for utilizing post-quantum pre-shared key (PPK) identifiers (PPK_ID) to determine control association key(s) (CAK(s)) and/or secure association key(s) (SAK(s)) utilized in MACsec sessions are described herein. A key server (KS) and a non-key server (NKS) may advertise capabilities indicating an ability to utilize PPKs as CAKs and/or SAKs in MACsec sessions. The KS may leverage a quantum key distribution (QKD) service to determine a PPK_ID and a PPK, which may be utilized as a CAK for a MACsec session with the NKS. The PPK_ID may be transmitted to the NKS, where the NKS may retrieve the PPK from the QKD, and a new group connectivity association may be established using the PPK as the CAK. In some examples, the KS may be configured to refresh the PPK as the CAK for instantiating subsequent MACsec sessions. Additionally, the KS may be configured to distribute a SAK in a similar manner.

20 Claims, 11 Drawing Sheets

(51) Int. Cl.

| | |
|---|---|
| ***H04L 69/06*** | (2022.01) |
| *H04L 69/24* | (2022.01) |
| *H04L 69/325* | (2022.01) |

(56) References Cited

U.S. PATENT DOCUMENTS

| | | | |
|---|---|---|---|
| 2021/0226782 | A1 | 7/2021 | Florit et al. |
| 2022/0232009 | A1 | 7/2022 | Gordon et al. |
| 2023/0071333 | A1 | 3/2023 | Inamdar et al. |
| 2023/0308424 | A1 | 9/2023 | Nix |

OTHER PUBLICATIONS

Post-quantum MACsec Key Agreement for Ethernet Networks. Cho et al. (Year: 2020).*

Secure and Scalabel Internet of Things Model Using Post-Quantum MACSec. Choi et al. (Year: 2024).*

Cho J.Y., et al., "Post-Quantum MACsec in Ethernet Networks", Journal of Cyber Security and Mobility, Mar. 11, 2021, vol. 10_1, 16 Pages.

* cited by examiner

^ Length shown denotes wrapped 256-bit PPK-ID/CAK. For 128-bit PPK-ID the AES Key Wrap size would be of 24 Octets

POST-QUANTUM SECURE MEDIA ACCESS CONTROL SECURITY (MACSEC) PRE-SHARED KEY AUTO-REFRESH

CROSS REFERENCE TO RELATED APPLICATIONS

This application claims priority to Indian Provisional Patent Application No. 202441069579, filed Sep. 13, 2024, the entire contents of which are incorporated herein by reference.

TECHNICAL FIELD

The present disclosure relates generally to key agreement protocols and, more specifically, to a streamlined method for use of pre-shared secret keys.

BACKGROUND

MACsec (Media Access Control security) is a secure Media Access Control (MAC) layer communication protocol. MACsec is a Layer 2 hop-by-hop encryption methodology that provides data confidentiality, integrity, and replay protection for media access-independent protocols. MACsec is described in the Institute of Electrical and Electronics Engineers (IEEE) 802.1AE standard, originally published in 2006 and revised in 2018. MACsec provides MAC layer encryption over networks by using out-of-band methods for encryption keying. MACsec encrypts all the data, except the source and destination MAC addresses of an Ethernet packet. Data can be secured on physical media using MACsec, which prevents data compromise at higher layers. As a result, MACsec encryption may take priority over any other encryption method, at higher layers. MACsec provides integrity for the entire frame including the source and destination MAC addresses.

Setting up a MACsec service utilizes a security association (SA) protocol, the MACsec Key Agreement (MKA) protocol. The MKA protocol is based on the IEEE 802.1x-2010 standard. The MKA protocol describes how session keys are provided and how encryption keys are managed. The MKA uses an Extensible Authentication Protocol Transport Layer Security (EAP-TLS) authentication method to mutually authenticate and get a Master Session Key (MSK) from which a Connectivity Association Key (CAK) is dynamically derived. The CAK is the root key for MKA key derivations.

A quantum attack on TLS, which is a public-key cryptography, may eventually compromise the MKA CAK and/or perhaps other keys, which would put the security of MACsec traffic at risk. However, it is thought that the MKA protocol may be made quantum secure.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
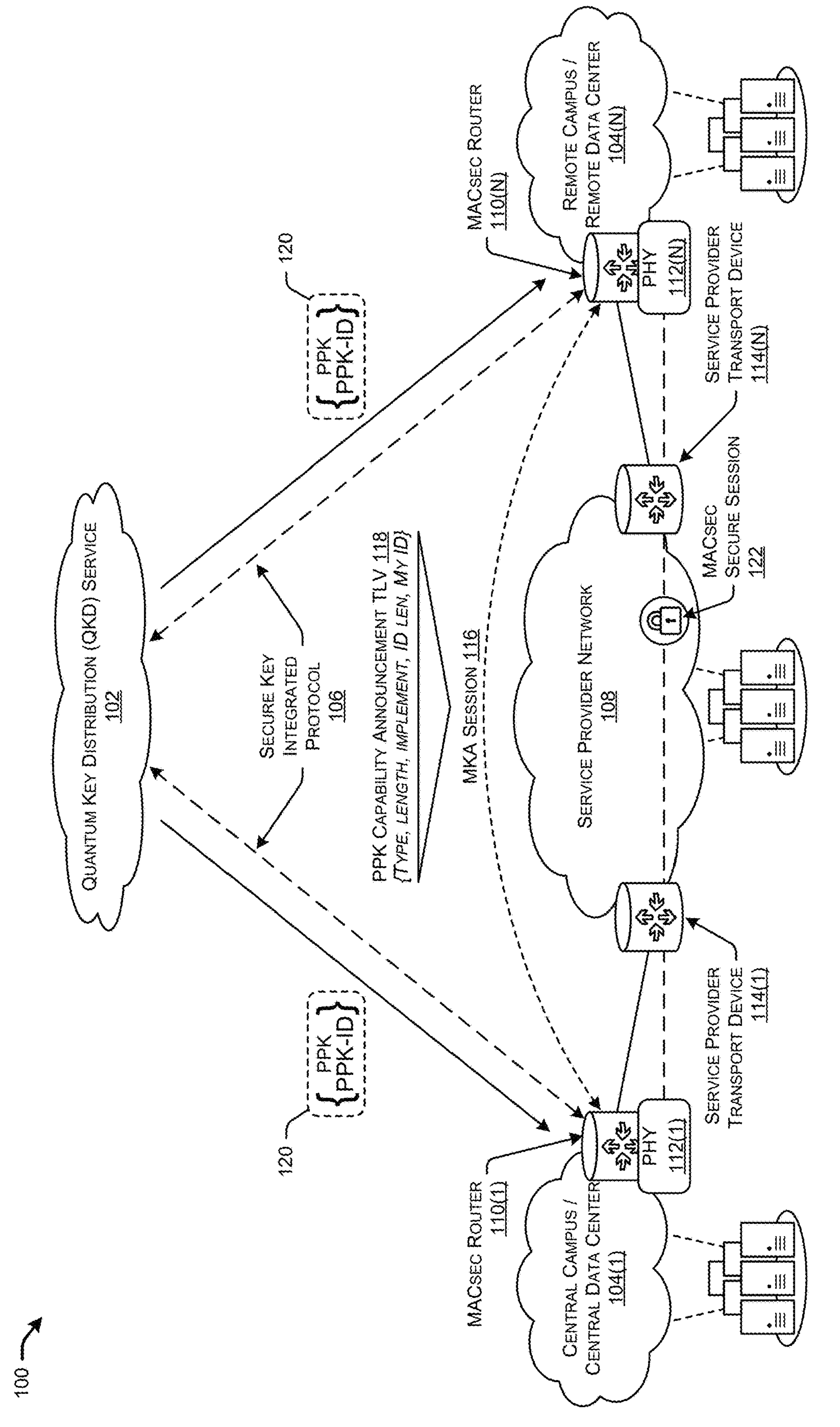
FIG. 1 illustrates a system-architecture diagram of an example environment for distributing post-quantum pre-shared key (PPK) identifiers utilized to determine control association key(s) (CAK(s)) and/or secure association key(s) (SAK(s)) utilized in MACsec traffic sessions as described herein.

This disclosure describes method(s) for utilizing post-quantum pre-shared key (PPK) identifiers to determine control association key(s) (CAK(s)) and/or secure association key(s) (SAK(s)) utilized in MACsec traffic sessions as described herein. The method includes sending, from a first computing node and to a second computing node, a first message comprising a first MACsec key agreement (MKA) announcement including a first portion populated with a first indication that the first computing node is capable of utilizing pre-shared secret keys associated with MACsec sessions and a second portion populated with a distributed shared key. Additionally, or alternatively, the method includes receiving, from the second computing node, a second message comprising a second MKA announcement including a third portion populated with a second indication that the second computing node is capable of utilizing the pre-shared secret keys associated with the MACsec sessions and a fourth portion populated with the distributed shared key. Additionally, or alternatively, the method includes determining to communicate with the second computing node via a first MACsec session based at least in part on the distributed shared key. Additionally, or alternatively, the method includes determining, based at least in part on the distributed shared key, a first pre-shared secret key utilized to authenticate communications associated with a second MACsec session between the first computing node and the second computing node. Additionally, or alternatively, the method includes sending, to the second computing node via the first MACsec session, a third message including a fifth portion populated with a first identifier associated with the first pre-shared secret key. Additionally, or alternatively, the method includes determining to communicate with the second computing device via the second MACsec session based at least in part on the first pre-shared secret key. Additionally, or alternatively, the method includes determining, based at least in part on the first pre-shared secret key, a second pre-shared secret key utilized to at least one of encrypt or decrypt communications associated with the second MACsec session. Additionally, or alternatively, the method includes sending, to the second computing node via the second MACsec session, a fifth message including a sixth portion populated with a second identifier associated with the second pre-shared secret key. Additionally, or alternatively, the method includes receiving, from the second computing node via the second MACsec session, a sixth message being encrypted based at least in part on the second pre-shared secret key.

Additionally, or alternatively, the method includes sending, from a first computing node and to a second computing node, a first message including a distributed shared key and a first indication that the first computing node is capable of utilizing pre-shared secret keys associated with MACsec sessions. Additionally, or alternatively, the method includes determining to communicate with the second computing node via a first MACsec session using the distributed shared key. Additionally, or alternatively, the method includes receiving, from the second computing node via the first MACsec session, a second message populated with a first identifier of a first pre-shared secret key utilized to authenticate communications associated with a second MACsec session between the first computing node and the second computing node. Additionally, or alternatively, the method includes determining, by the first computing node and based at least in part on the first identifier, the first pre-shared secret key. Additionally, or alternatively, the method includes determining to communicate with the second computing node via the second MACsec session using the first pre-shared secret key. Additionally, or alternatively, the method includes receiving, from the second computing node via the second MACsec session, a third message populated with a second identifier of a second pre-shared secret key utilized to at least one of encrypt or decrypt communications associated with the second MACsec session. Additionally, or alternatively, the method includes determining, by the first computing node and based at least in part on the second identifier, the second pre-shared secret key. Additionally, or alternatively, the method includes sending, to the second computing node via the second MACsec session, a fourth message being encrypted based at least in part on the second pre-shared secret key.

Additionally, the techniques described herein may be performed by a system and/or device having non-transitory computer-readable media storing computer-executable instructions that, when executed by one or more processors, performs the method described above.

Example Embodiments

A "pre-shared key" (PSK) (also referred to herein as a "distributed shared key") is a key that has been produced, such as by a software and/or hardware component, with copies transported in an unspecified way from a first location (e.g., location 1) to a second location (e.g., location N, where N may be any integer greater than 1). Therefore, stations in both location(s) 1 and/or N may use the same key, which is referred to as a "distributed shared key". A "post-quantum pre-shared secret key" (PPK) (also referred to herein as a "pre-shared secret key") is a key that has been produced, such as by a software and/or hardware component, and/or is configured in a first location (e.g., location 1) and/or a second location (e.g., location N) as a key value pair (key identifier and key). Using PPKs may ameliorate the risk of quantum attack on encrypted communication. For example, each entity may separately build a secure association key (SAK) for encrypting communication between the two entities, by processing the PPK using the same key derivation function without ever sending the actual PPK and/or SAK over the wire. In some examples, PPKs may be utilized as connectivity association key(s) (CAK(s)) and/or SAK(s) according to the examples described herein.

In some examples, as a communication link (e.g., a MACsec session) is being established, a PSK identifier may be communicated from a first entity to a second entity. The PSK identifier may be utilized, for example, by each entity as a seed for each entity to separately generate the same PPK or separately securely obtain the PPK from a key source, such as, for example, a quantum key distribution (QKD) service. The PPK may be separately generated or obtained by each entity and may then be used by each entity as the basis for building the SAK to be used for secure communication (e.g., encryption and/or decryption of messages) between the two entities.

In establishing communications and/or communicating according to the MACsec protocol, a PSK may be utilized if both to-be communicating entities are capable of establishing a communication link and/or communicating based on a pre-shared key. IEEE 802.1x-2010 standard describes how PSKs may be utilized including for example, at Section 6.2.

The PSK may include a connectivity association key name (CKN) and a CAK. In some examples, a PSK may be exchanged between two devices at each end of a point-to-point link to enable MACsec using static CAK security mode. The MACsec Key Agreement (MKA) protocol is enabled after the PSKs are successfully verified and exchanged. In some examples, the PSKs, the CKN, and CAK, must match on both ends of a link in order for a MACsec communication session to be established.

In some examples according to the MACsec protocol, the MKA protocol is extended to allow a key server (KS) entity to distribute a PPK identifier (PPK_ID) to a non-key server (NKS) peer entity. This distribution of PPK_ID may be performed in place of distributing an actual CAK and/or SAK to MACsec peers. The PPK_ID may be negotiated between the KS and NKS entities. Both the KS and NKS entities may use the negotiated PPK_ID to separately obtain the same PPK from a QKD, which may serve as a CAK for authenticating communication between the KS and NKS entity, a SAK for securing communication between the KS and NKS entity, and/or be the basis for determining the SAK.

In some examples, one entity may be configured to establish a MAC layer communication link and/or communicate based on a post-quantum (or other) pre-shared secret key (e.g., a PPK) whereas another entity may not be capable of and/or configured to establish a MAC layer communication link and/or communicate based on a PPK. For example, for entities that may communicate using MACsec, a KS entity may be configured to establish a MAC layer communication link and/or communicate based on a PPK whereas an NKS entity may not be capable of and/or configured to establish a MAC layer communication link and/or communicate based on a PPK.

It may be desirable to be backwards-compatible, so that an entity such as a station or a computing node that is capable of establishing a MAC layer communication link and/or securely communicating based on a PPK may establish a MAC layer communication link and/or communicate with another entity instead based on a PSK if, for example, the other entity is not capable of securely communicating based on a pre-shared secret key.

In some examples, an entity may advertise its capability for communicating using a secure MAC layer communication protocol based on a PPK, such as, for example, in an MKA announcement. However, protocols for secure MAC layer communication may not inherently include functionality for an entity to advertise its ability to communicate using a secure MAC layer communication protocol based on a PPK. In some examples, an entity that receives such an advertisement may not actually have capability to communicate using a secure MAC layer communication protocol based on a PPK. Moreover, an entity that receives such an advertisement may not respond to it or even know how to respond to it.

Additionally, or alternatively, an entity may include in the announcement/advertisement one or more indications of types of PPKs that may be utilized for MACsec communications. For example, the announcement may include an indication of whether the entity is capable of communicating using a secure MAC layer communication protocol based on a PPK representing one of the CAK and/or the SAK. That is, an announcement from an entity may include data indicating that the entity is capable and/or incapable of establishing MACsec sessions utilizing a PPK instead of a PSK for the CAK and/or utilizing a PPK to derive the SAK rather than conventional SAK mechanisms based on the PSK.

In some examples, after an entity advertises to another entity its capability to communicate according to a secure MAC layer communication protocol based on a PPK (including indications of CAK and/or SAK capability), the entity may make a determination whether to establish communication with the other entity according to the secure MAC layer communication protocol based on a PPK or to establish communication with the other entity according to the secure MAC layer communication protocol based on a PSK.

For example, the entity may make the determination based at least in part on not receiving a response to the advertisement by the entity of its capability to communicate using a secure MAC layer communication protocol based on a PPK. For example, the entity may wait a predetermined time for such a response and, if the response is not received, the entity may make a determination to establish communication with the other entity according to the secure MAC layer communication protocol based on a PSK. For example, as part of establishing secure MAC layer communication with the other entity, the entity may distribute a key to the other entity to be shared for conducting secure MAC layer communication between the entity and the other entity based on the PSK.

In some examples, the entity may receive a response, such as within the predetermined waiting time. The received response may be an advertisement of the other entity's capability to communicate according to a secure MAC layer communication protocol based on a PPK, such as, for example, in an MKA announcement. Based at least in part on the entity receiving such a response, the entity may make a determination to establish communication with the other entity according to the secure MAC layer communication protocol based on a PPK. For example, the entity may determine to establish communication with the other entity using a first PPK representing the CAK for the MACsec session, a second PPK representing the SAK for the MACsec session, and/or both.

In some examples, the entity may provide an indication of a PPK to the other entity, and the other entity may respond with an indication that the other entity accepts or rejects the indication of the PPK. Based at least partly on the indication of the other entity accepting or rejecting the indication of the PPK, the entity may make a determination to establish communication with the other entity according to the secure MAC layer communication protocol based on a PPK or to establish communication with the other entity according to the secure MAC layer communication protocol based on a PSK. For example, for communication according to the secure MAC layer communication protocol based on a PPK, the entity and the other entity may each operate to independently determine the PPK based on the indication of the PPK the entity provides to the other entity.

As mentioned above, a PPK may be utilized to represent a CAK associated with a MACsec session in place of a PSK. Additionally, or alternatively, a PPK may be utilized to determine the SAK associated with a MACsec session in place of a PSK. That is, the entity may establish a first MACsec session based on authentication of PSKs, such as, for example, CKN-1 (CAK-1 (PSK)). For example, the first MACsec session may be identified as CKN-1 and be based on CAK-1 which was configured using the PSK. During the establishment of this session, the capabilities of each entity may be exchanged, indicating the ability of utilizing PPK based group CAK and/or PPK based SAK, or neither. Based upon the ability of utilizing PPK based group CAK, the entity may retrieve a first PPK and first PPK_ID tuple from a key source (e.g., a QKD service) and may provide the first PPK_ID to the other entity via the first MACsec session (CKN-1), and the other entity may utilize the first PPK_ID to retrieve the first PPK (e.g., from the key source) which will serve as a new group CAK. Upon acceptance by both entities, a second MACsec session based on a new group connectivity association (CA) CKN-G1 (CAK-G1(first PPK)) may be established. For example, the second MACsec session may be identified as CKN-G1 and be based on CAK-G1, which was configured using the first PPK. Since the first PPK_ID was utilized to derive the first PPK by both entities, the actual first PPK is never exposed over the wire in communications. With the new group CAK-G1 established, the SAK may be distributed using the second MACsec session. For example, based upon the ability of utilizing PPK based SAK, the entity may retrieve a second PPK and second PPK_ID tuple from the key source and may provide the second PPK_ID to the other entity via the second MACsec session (CKN-G1), and the other entity may utilize the second PPK_ID to retrieve the second PPK which may serve as a basis for determining the SAK for CKN-G1. Upon acceptance by both entities and determination of the SAK using the second PPK, communications over the second MACsec session (CKN-G1) may now be encrypted and/or decrypted based on the SAK. Again, since the SAK was derived based on the second PPK by both entities, and the other entity obtained the second PPK based on the second PPK_ID, the actual second PPK is never exposed over the wire in communications.

In some examples, a CAK rollover event may occur, requiring both entities to form a new group CA. Examples of CAK rollover events may include an expiration of a period of time associated with a PPK, a security breach associated with a PPK and/or a MACsec session, a configuration change associated with an entity involved in a MACsec session, a status change (e.g., offline, online, restarting, etc.) of an entity involved in a MACsec session, and/or the like. In such scenarios, the entity may retrieve a new PPK and PPK_ID tuple from the key source, such as, for example, a third PPK and a third PPK_ID. The entity may transmit the third PPK_ID to the other entity as mentioned above, and the other entity may obtain the third PPK which is utilized as the new CAK (CAK-G2) to establish the new group CA identified as CKN-G2. Once the third MACsec session is established (e.g., CKN-G2) the entity may then redistribute a new SAK based on the new CAK-G2. As mentioned above, the distribution of the new SAK is based on the entity sending a fourth PPK_ID associated with a fourth PPK to the other entity via the third MACsec session, and the other entity retrieving the fourth PPK from the key source, which is then utilized as the SAK for CKN-G2.

As mentioned above, the other entity may be configured with capability to respond to an advertisement from the entity of the entity's capability to communicate according to a secure MAC layer communication protocol based on a PPK. In some examples, the other entity may not respond to an advertisement the other entity receives indicating the entity's capability to communicate according to a secure MAC layer communication protocol based on a PPK. Additionally, or alternatively, the other entity may receive a PSK distributed from the entity, and the other entity may communicate with the entity according to the secure MAC layer communication protocol based on the PSK.

As described herein, a computing-based, network-based, cloud-based service, network device, entity, node, can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to MACsec PSK auto refresh. For instance, the techniques described herein include post-quantum techniques for utilizing PPK(s) as group CAK and/or SAK in MACsec sessions. By utilizing PPK(s) as group CAK(s), the PSK auto refresh capability of MACsec may provide quantum resist security to MACsec session because the PPK_ID is sent over the wire to obtain the PPK, and the actual PPK is never sent over the wire. Both entities obtain the actual PPK from a quantum key source based on the PPK_ID. Additionally, these techniques may be utilized to derive a SAK for MACsec sessions. This leads to increased network security as the MACsec sessions may be quantum resistant. Additionally, by configuring the PSK auto refresh capability to utilize the PPK(s), the work by network admins may be reduced to maintain function of the network. Moreover, network administrators may have no knowledge of the dynamically generated PPK(s) utilized as group CAK and/or SAK, protecting the entire MKA hierarchy rooted at the CAK, including the key encryption key (KEK), integrity check value key (ICK) and/or the SAK. Further, zero-touch deployments may be functional, leading to greater utilization of the network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for a quantum key distribution (QKD) service 102 to distribute post-quantum pre-shared key(s) (PPK(s)) and/or PPK identifiers (PPK_ID(s)) utilized to determine control association key(s) (CAK(s)) and/or secure association key(s) (SAK(s)) utilized in MACsec traffic sessions. As illustrated, the environment 100 may include a central campus/central data center 104(1) and/or a remote campus/remote data center 104(N), also referred to herein as "stations" 104. In some examples, the environment 100 may include any number of such stations 104(1)-(N) connected to the QKD service 102 via a secure key integrated protocol 106, where N may be any integer greater than 1. In some examples, the stations 104(1)-(N) may establish MACsec communication sessions with each other via a service provider network 108. Generally, the QKD service 102, the stations 104, and/or the service provider network 108 may include devices that are housed or located in one or more data centers that may be located at different physical locations.

For example, the environment 100 may include a first station 104(1), such as, for example, a central campus/central data center and/or a second station 104(N), such as, for example, a remote campus/remote data center. The first station 104(1) may include a first MACsec capable router 110(1) having a physical layer 112(1) capable of connecting the first station 104(1) to the service provider network 108 via a service provider transport device 114(1). The service provider network 108 may include N number of service provider transport device(s) 114, where N may be any integer. Additionally, or alternatively, the second station 104(2) may include a second MACsec capable router 110(2) having a physical layer 112(2) capable of connecting the second station 104(2) to the service provider network 108 via a service provider transport device 114(N).

In some examples, as a communication link (e.g., a MACsec session) is being established, a PSK identifier may be communicated from the first station 104(1) to the second station 104(N) via an MKA session 116. The PSK identifier may be utilized, for example, by each entity as a seed for each entity (e.g., the first station 104(1) and the second station 104(N) to separately generate the same PPK or separately securely obtain the PPK from a key source, such as, for example, the QKD service 102. The PPK may be separately generated or obtained by each entity and may then be used by each entity as the basis for building the SAK to be used for secure communication (e.g., encryption and/or decryption of messages) between the two entities.

In establishing communications and/or communicating according to the MACsec protocol, a PSK may be utilized if both to-be communicating entities are capable of establishing a communication link and/or communicating based on a pre-shared key. IEEE 802.1x-2010 standard describes how PSKs may be utilized including for example, at Section 6.2.

The PSK may include a connectivity association key name (CKN) and a CAK. In some examples, a PSK may be exchanged between the two MACsec routers 110(1), 110(N) at each end of a point-to-point link to enable MACsec using static CAK security mode. The MACsec Key Agreement (MKA) protocol is enabled after the PSKs are successfully verified and exchanged during the MKA session 116. In some examples, the PSKs, the CKN, and CAK, must match on both ends of a link in order for a MACsec communication session to be established.

In some examples according to the MACsec protocol, the MKA protocol is extended to allow a key server (KS) entity, such as, for example, the first station 104(1), to distribute a PPK identifier (PPK_ID) to a non-key server (NKS) peer entity, such as, for example, the second station 104(N). This distribution of PPK_ID may be performed in place of distributing an actual CAK and/or SAK to MACsec peers. The PPK_ID may be negotiated between the KS and NKS entities. Both the KS and NKS entities may use the negotiated PPK_ID to separately obtain the same PPK from a QKD service 102, which may serve as a CAK for authenticating communication between the KS and NKS entity, a SAK for securing communication between the KS and NKS entity, and/or be the basis for determining the SAK.

In some examples, the first station 104(1) and/or the second station 104(N) may advertise its capability for communicating using a secure MAC layer communication protocol based on a PPK, such as, for example, in an MKA announcement 118 (e.g., a type length value (TLV) included in an MKA announcement). However, protocols for secure MAC layer communication may not inherently include functionality for an entity to advertise its ability to communicate using a secure MAC layer communication protocol based on a PPK. In some examples, an entity that receives such an advertisement may not actually have capability to communicate using a secure MAC layer communication protocol based on a PPK. Moreover, an entity that receives such an advertisement may not respond to it or even know how to respond to it.

Additionally, or alternatively, the first station 104(1) and/or the second station 104(N) may include in the MKA announcement 118 (also referred to herein as an advertisement) one or more indications of types of PPKs that may be utilized for MACsec communications. For example, the announcement 118 may include an indication of whether the first station 104(1) and/or the second station 104(N) is capable of communicating using a secure MAC layer communication protocol based on a PPK representing one of the CAK and/or the SAK. That is, an announcement from the first station 104(1) and/or the second station 104(N) may include data indicating that the first station 104(1) and/or the second station 104(N) is capable and/or incapable of establishing MACsec sessions utilizing a PPK instead of a PSK for the CAK and/or utilizing a PPK to derive the SAK rather than conventional SAK mechanisms based on the PSK.

In some examples, after the first station 104(1) advertises its capability to communicate according to a secure MAC layer communication protocol based on a PPK (including indications of CAK and/or SAK capability), the first station 104(1) may make a determination whether to establish communication with the second station 104(N) according to the secure MAC layer communication protocol based on a PPK or to establish communication with the second station 104(N) according to the secure MAC layer communication protocol based on a PSK.

For example, the first station 104(1) may make the determination based at least in part on not receiving a response to the advertisement by the first station of its capability to communicate using a secure MAC layer communication protocol based on a PPK. For example, the first station 104(1) may wait a predetermined time for such a response and, if the response is not received, the first station 104(1) may make a determination to establish communication with the second station 104(N) according to the secure MAC layer communication protocol based on a PSK. For example, as part of establishing secure MAC layer communication with the second station 104(N), the first station 104(1) may distribute a key to the second station 104(N) to be shared for conducting secure MAC layer communication between the first station 104(1) and the second station 104(N) based on the PSK.

In some examples, the first station 104(1) may receive a response, such as within the predetermined waiting time. The received response may be an advertisement of the second station's 104(N) capability to communicate according to a secure MAC layer communication protocol based on a PPK, such as, for example, in an MKA announcement 118. Based at least in part on the first station 104(1) receiving such a response, the first station 104(1) may make a determination to establish communication with the second station 104(N) according to the secure MAC layer communication protocol based on a PPK. For example, the first station 104(1) may determine to establish communication with the second station 104(N) using a first PPK representing the CAK for the MACsec session, a second PPK representing the SAK for the MACsec session, and/or both.

In some examples, the first station 104(1) may provide an indication of a PPK to the second station 104(N), and the second station 104(N) may respond with an indication that the second station 104(N) accepts or rejects the indication of the PPK. Based at least partly on the indication of the second station 104(N) accepting or rejecting the indication of the PPK, the first station 104(1) may make a determination to establish communication with the second station 104(N) according to the secure MAC layer communication protocol based on a PPK or to establish communication with the second station 104(N) according to the secure MAC layer communication protocol based on a PSK. For example, for communication according to the secure MAC layer communication protocol based on a PPK, the first station 104(1) and the second station 104(N) may each operate to independently determine the PPK based on the indication of the PPK the first station 104(1) provides to the second station 104(N). That is, the first station 104(1) may obtain a PPK and PPK_ID tuple 120 from the QKD service 102, transmit the PPK_ID to the second station 104(N), where the second station 104(N) may utilize the PPK_ID to determine the PPK and PPK_ID tuple from the QKD, and both stations 104 may utilize the PPK to establish a MACsec secure session 122, as described in more detail below with respect to FIGS. 4 and 5.

Figure 2:
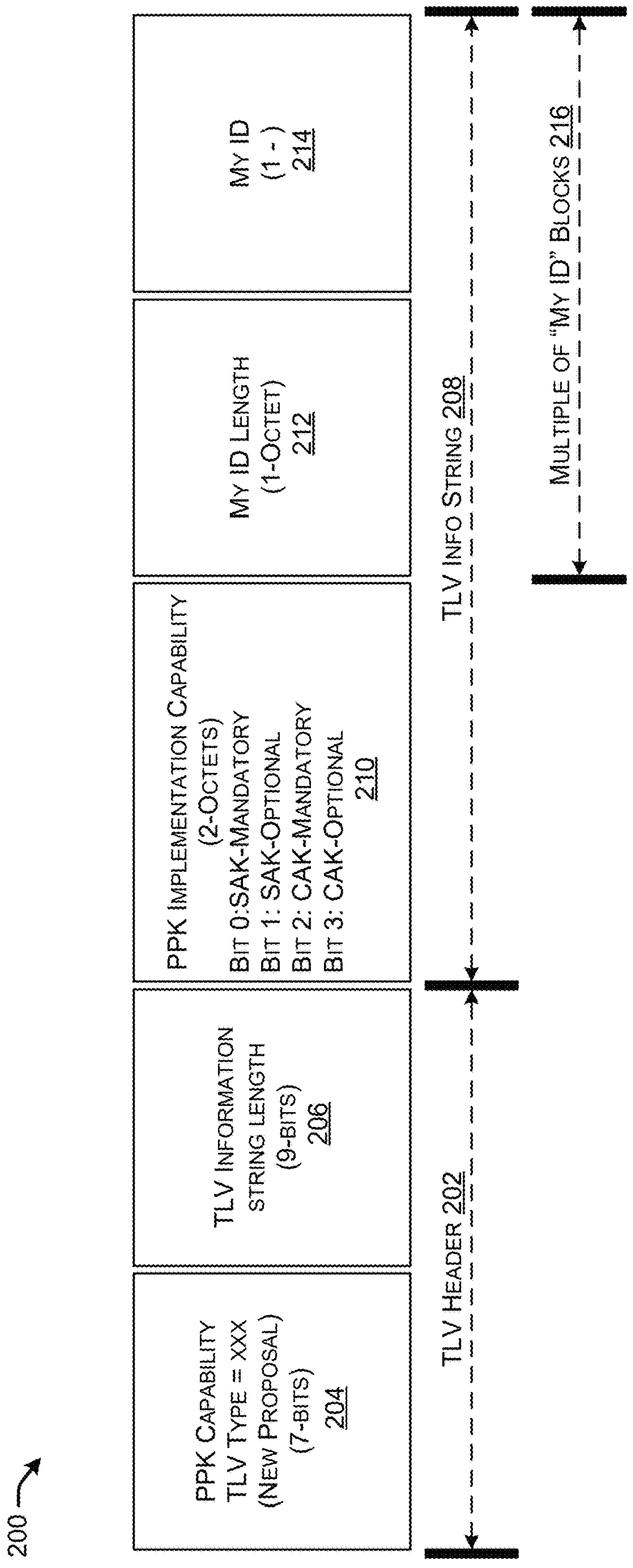
FIG. 2 illustrates block diagram of an example MACsec key agreement (MKA) announcement as described herein.

FIG. 2 illustrates block diagram of an example MACsec key agreement (MKA) announcement 200 as described herein. In some examples, the MKA announcement 200 may correspond to the MKA announcement 118, as described with respect to FIG. 1. Additionally, or alternatively, the MKA announcement 200 may be configured as an MKPDU.

Each MKA participant may advertise its PPK capability as a part of the announcement parameter set of the MKA announcement 200.

The MKA announcement 200 may include a TLV header 202 comprising a first 7-bits 204 representing a PPK capability and/or a TLV type indicating the type of capability and a following 9-bits 206 representing the following TLV information string length. The TLV information string 208 may include a first 2-octets reserved to indicate PPK implementation capability 210. For example, a first bit may indicate that PPK based SAK is mandatory, a second bit may indicate that PPK based SAK is optional, a third bit may indicate that PPK based group CAK is mandatory, and/or a fourth bit may indicate that PPK based group SAK is optional. The TLV information string 208 may then include a following octet 212 indicating the length of the following "My ID" blocks 214 of the TLV information string 208. That is, the TLV information string may include multiple of my ID blocks 216, such that the my ID block 214 may be 1-N octets long, where N may be any integer greater than 1.

Figure 3:
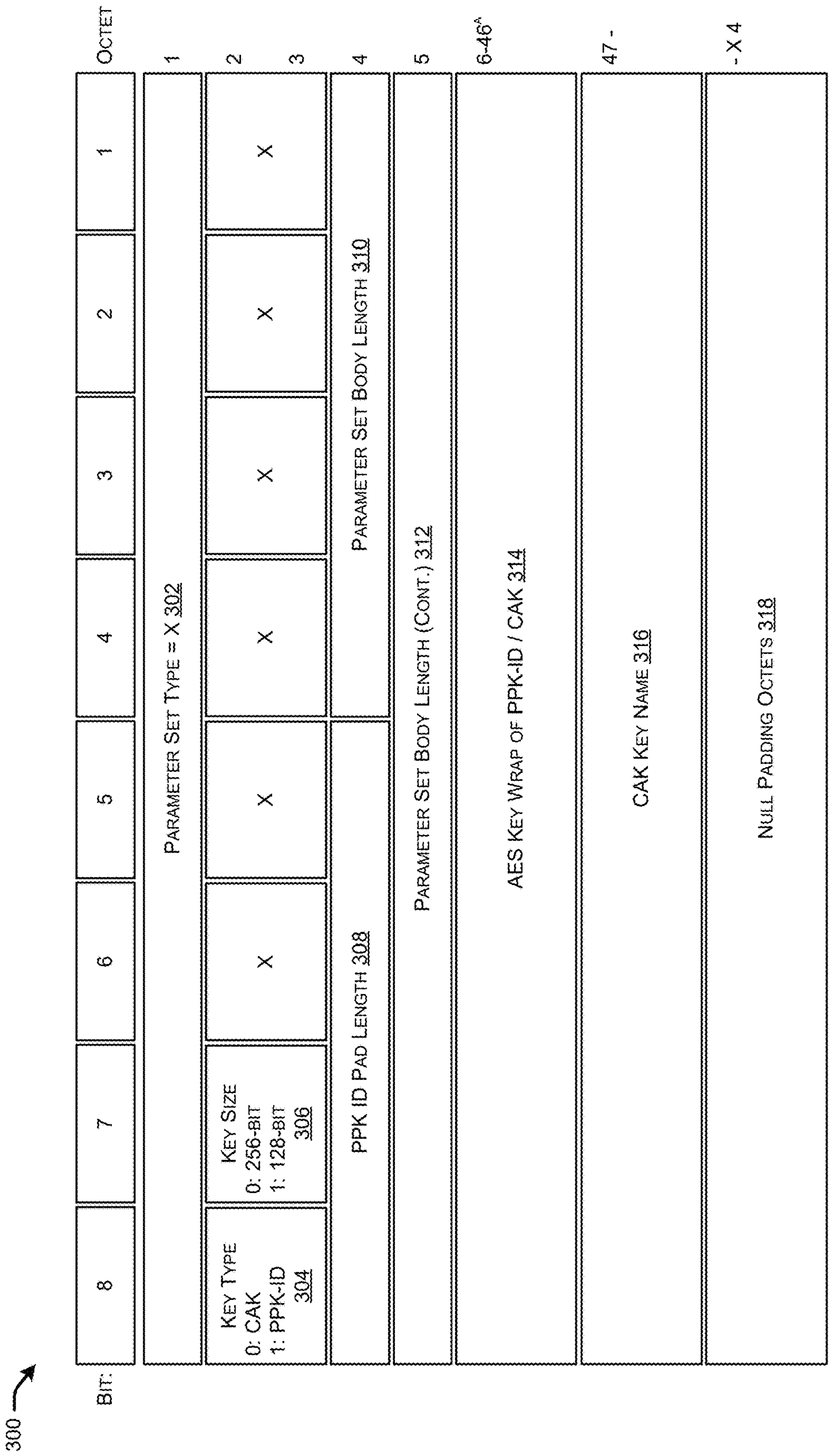
FIG. 3 illustrates a block diagram of an example distributed post-quantum pre-shared key (PPK) parameter set as described herein.

FIG. 3 illustrates a block diagram of an example distributed post-quantum pre-shared key (PPK) parameter set 300, as described herein. In some examples, the PPK parameter set 300 may correspond to a distributed CAK-PPK-ID parameter set and/or to a distributed SAK-PPK-ID parameter set. As illustrated, each of the bits and/or octets are denoted for the PPK parameter set 300.

The PPK parameter set 300 may include a field in octet 1 to indicate the parameter set type 302. This indication of the parameter set type 302 may indicate whether the PPK parameter set 300 is configured as a distributed CAK-PPK-ID parameter set or a distributed SAK-PPK-ID parameter set. The PPK parameter set 300 may include additional fields in octet(s) 2 and 3, such as, for example, an indication of the key type 304, indicating whether conventional CAK and/or SAK techniques are being utilized (e.g., as indicated by a "0") or PPK_ID will be utilized for the CAK and/or SAK. Additionally, or alternatively, octets 2 and 3 may include a field indicating key size 306, representing the size of the key utilized. In some examples, bits 6-1 of octets 2 and 3 may be padded or otherwise reserved.

Octet 4 of the PPK parameter set 300 may include a field indicating the PPK ID pad length 308 from bits 8-5 and/or another field indicating the parameter set body length 310 from bits 4-1. Octet 5 of the PPK parameter set 300 may include a field representing a continuation of the parameter set body length 312. Octets 6-46[a] of the PPK parameter set 300 may represent the AES key wrap of the PPK_ID/the CAK 314, where a length shown denotes wrapped 256-bit PPK_ID/CAK. Alternatively, for 128-bit PPK_ID the AES key wrap size would be over 24 octets. Octets 47 and on may be utilized to indicate the CAK key name 316, and there may be a number of null padding octets 318.

Figure 4:
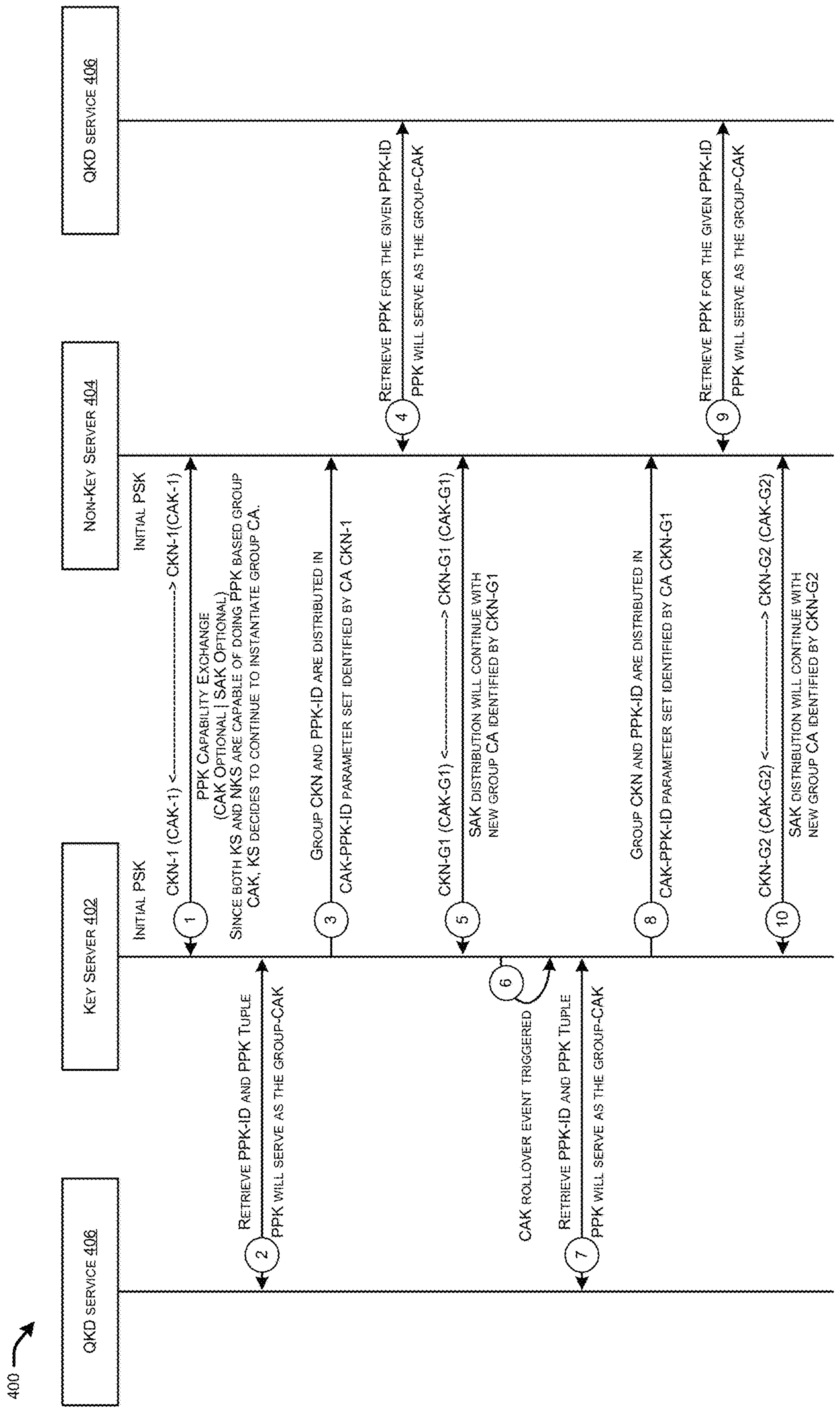
FIG. 4 illustrates a flow diagram of an example method for distributing post-quantum pre-shared key (PPK) identifiers utilized to determine control association key(s) (CAK(s)) and/or secure association key(s) (SAK(s)) utilized in MACsec traffic sessions as described herein.

FIG. 4 illustrates a flow diagram of an example method 400 for distributing post-quantum pre-shared key (PPK) identifiers from a key server 402 to a non-key server 404 to retrieve PPKs from a QKD service 406 and utilize the PPK as control association key(s) (CAK(s)) and/or secure association key(s) (SAK(s)) in MACsec traffic sessions as described herein. In some examples, the key server 402, the non-key server 404, and/or the QKD may correspond to the first station 104(1), the second station 104(N), and/or the QKD service 102, as described with respect to FIG. 1.

As mentioned above, a PPK may be utilized to represent a CAK associated with a MACsec session in place of a PSK. Additionally, or alternatively, a PPK may be utilized to determine the SAK associated with a MACsec session in place of a PSK. The method 400 may begin at "1," where the key server 402 may establish a first MACsec session based on authentication of PSKs, such as, for example, CKN-1 (CAK-1 (PSK)). For example, the first MACsec session may be identified as CKN-1 and be based on CAK-1 which was configured using the PSK. During the establishment of this session, the capabilities of both the key server 402 and/or the non-key server 404 may be exchanged, indicating the ability of utilizing PPK based group CAK and/or PPK based SAK, or neither.

At "2," based upon the ability of utilizing PPK based group CAK, the key server 402 may retrieve a first PPK and first PPK_ID tuple from the QKD service 406. At "3," the key server 402 and may provide the first PPK_ID to the non-key server 404 via the first MACsec session (CKN-1). In some examples, the key server 402 may send the first PPK_ID to the non-key server 404 via a PPK parameter set, such as, for example, the PPK parameter set 300, as described with respect to FIG. 3. At "4," the non-key server 404 may utilize the first PPK_ID to retrieve the first PPK from the QKD service 406, which will serve as a new group CAK. At "5," upon acceptance by both entities, a second MACsec session based on a new group connectivity association (CA) CKN-G1 (CAK-G1(first PPK)) may be established. For example, the second MACsec session may be identified as CKN-G1 and be based on CAK-G1, which was configured using the first PPK. Since the first PPK_ID was utilized to derive the first PPK by both the key server 402 and the non-key server 404, the actual first PPK is never exposed over the wire in communications.

In some examples, with the new group CAK-G1 established, the SAK may be distributed using the second MACsec session. For example, based upon the ability of utilizing PPK based SAK, the key server 402 may retrieve a second PPK and second PPK_ID tuple from the QKD service 406 and may provide the second PPK_ID to the non-key server 404 via the second MACsec session (CKN-G1), and the non-key server 404 may utilize the second PPK_ID to retrieve the second PPK which may serve as a basis for determining the SAK for CKN-G1. Upon acceptance by both the key server 402 and the non-key server 404 and determination of the SAK using the second PPK, communications over the second MACsec session (CKN-G1) may now be encrypted and/or decrypted based on the SAK. Again, since the SAK was derived based on the second PPK by both the key server 402 and the non-key server 404, and the non-key server 404 obtained the second PPK based on the second PPK_ID, the actual second PPK is never exposed over the wire in communications.

In some examples, at "6," a CAK rollover event may occur, requiring both the key server 402 and the non-key server 404 to form a new group CA. Examples of CAK rollover events may include an expiration of a period of time associated with a PPK, a security breach associated with a PPK and/or a MACsec session, a configuration change associated with an entity involved in a MACsec session, a status change (e.g., offline, online, restarting, etc.) of an entity involved in a MACsec session, and/or the like. In such scenarios, at "7," the key server 402 may retrieve a new PPK and PPK_ID tuple from the QKD service 406, such as, for example, a third PPK and a third PPK_ID. At "8," the key server 402 may transmit the third PPK_ID to the non-key server 404, similarly as mentioned above. At "9," the non-key server 404 may obtain the third PPK. At "10," the third PPK is utilized as the new CAK (CAK-G2) to establish the new group CA identified as CKN-G2. In some examples, once the third MACsec session is established (e.g., CKN- G2) the key server 402 may then redistribute a new SAK based on the new CAK-G2. As mentioned above, the distribution of the new SAK is based on the key server 402 sending a fourth PPK_ID associated with a fourth PPK to the non-key server 404 via the third MACsec session, and the non-key server 404 retrieving the fourth PPK from the QKD service 406, which is then utilized as the SAK for CKN-G2.

Figure 5:
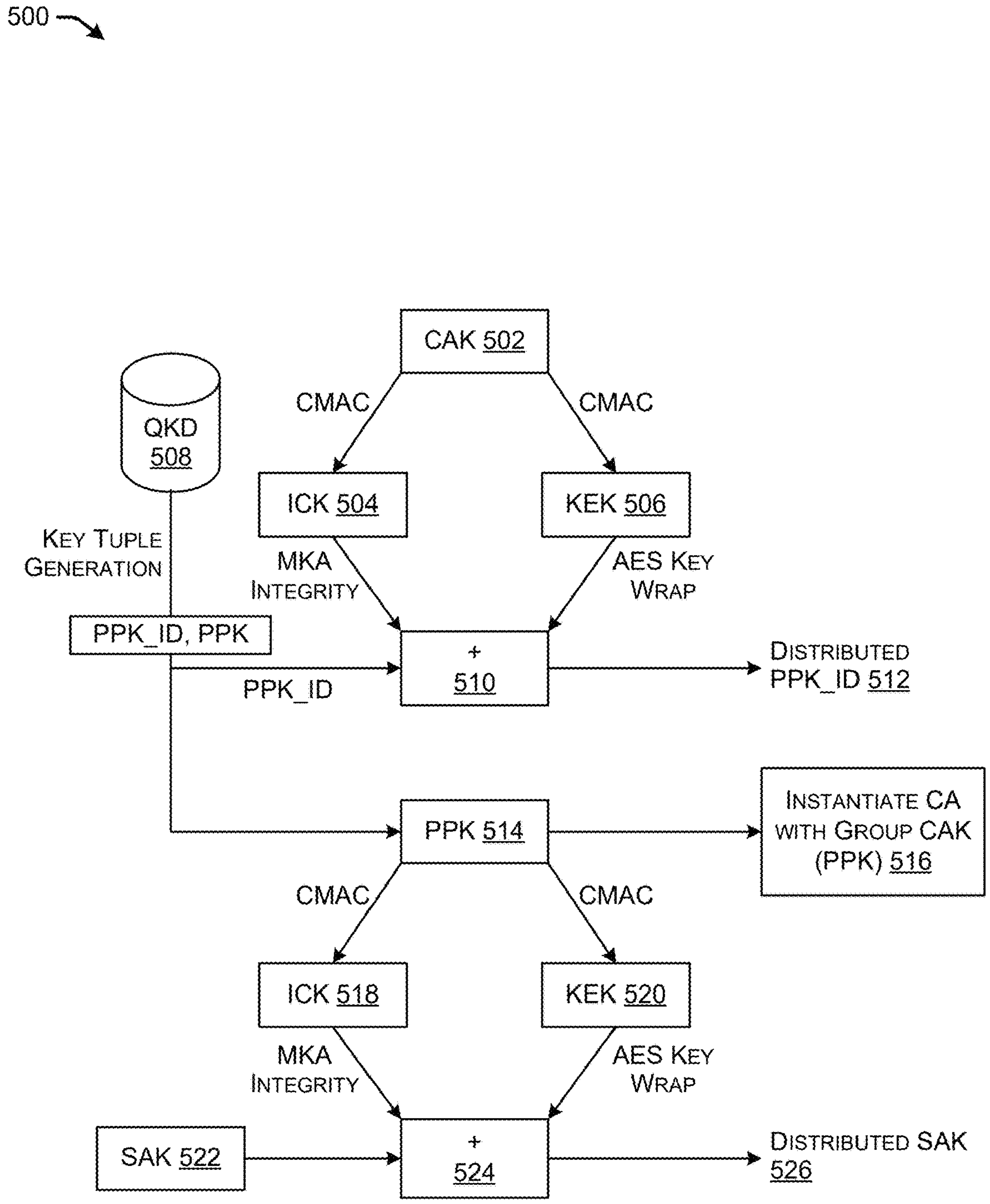
FIG. 5 illustrates a block diagram for a key server to determine a PPK identifier, a PPK, and/or an SAK utilized to establish encrypted MACsec traffic sessions as described herein.

FIG. 5 illustrates a block diagram 500 for a key server to determine a PPK identifier, a PPK, and/or an SAK utilized to establish encrypted MACsec traffic sessions as described herein. In some examples, a key server may correspond to the first station 104(1) and/or the key server 402 as described with respect to FIGS. 1 and 4, respectively.

The diagram 500 includes a CAK 502, which will serve as the basis for all of the key generation by the key server. One or more cipher-based message authentication code (CMAC) techniques are performed with respect to the CAK 502 to determine an integrity check key (ICK) 504 and/or a key encryption key (KEK) 506. Then, the key server may leverage a QKD service 508, such as, for example, the QKD service 102 and/or the QKD service 406 as described with respect to FIGS. 1 and 4, respectively, to determine a PPK_ID, PPK tuple. At 510, the key server may then encrypt the PPK_ID with an MKA integrity check based on the ICK 504 and/or wrap the PPK_ID in an AES key wrap based on the KEK 506, which is then sent to the non-key server as the distributed PPK_ID 512.

At 514, the key server may determine the PPK 514 from the QKD service 508 based on the PPK_ID, and the key server may utilize the PPK 514 to instantiate connection authority with the group CAK 516 configured as the PPK 514. From here, one or more CMAC techniques are performed with respect to the PPK 514 to determine another ICK 518 and/or another KEK 520. The key server may then determine the actual SAK 522. At 524, the key server may then encrypt the SAK with an MKA integrity check based on the ICK 518 and/or wrap the SAK in an AES key wrap based on the KEK 520, which is then sent to the non-key server as the distributed SAK 526.

Figure 6:
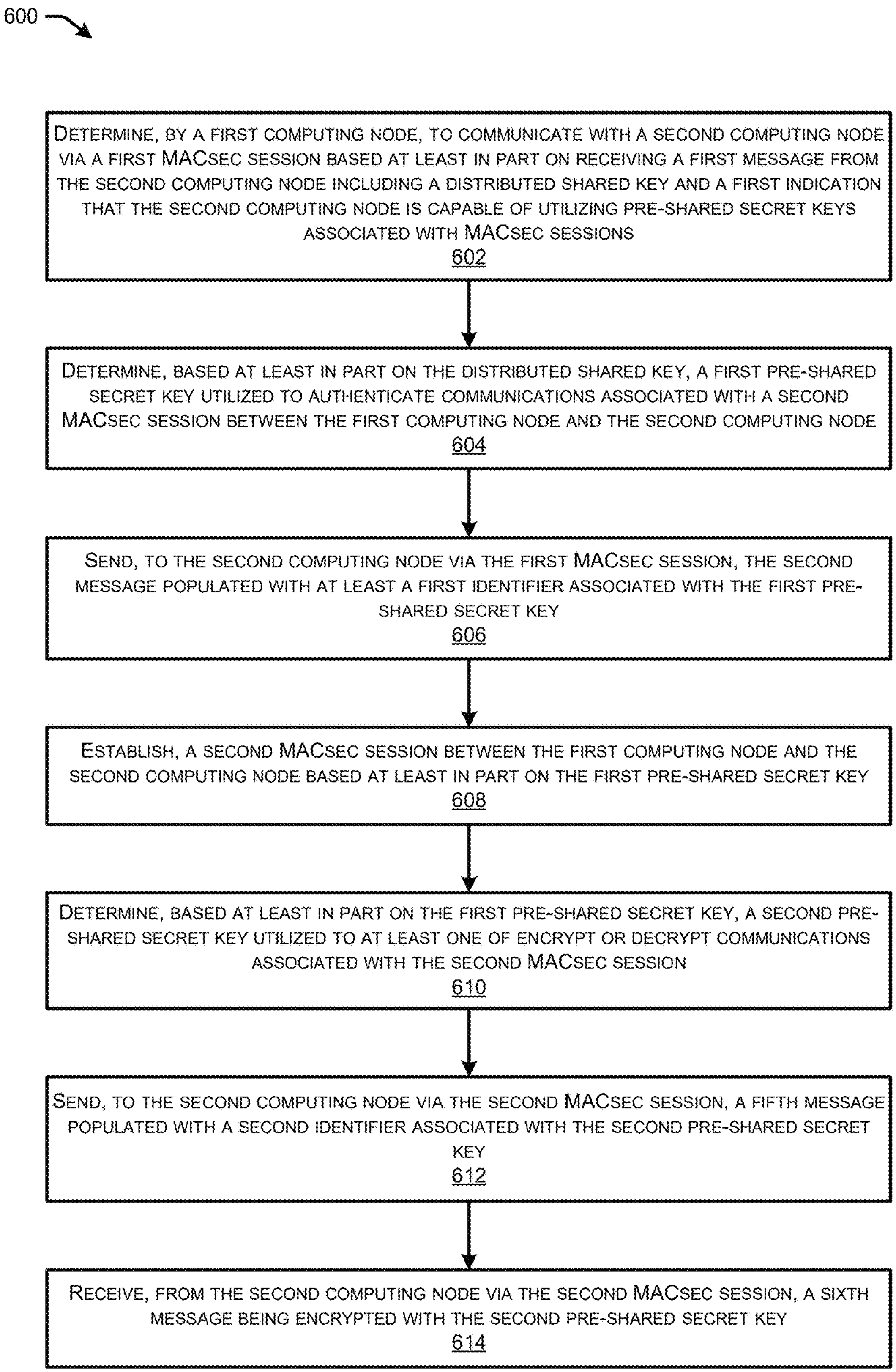
FIG. 6 illustrates a flow diagram of an example method for distributing post-quantum pre-shared key (PPK) identifiers utilized to establish encrypted MACsec traffic sessions as described herein.
Figure 7:
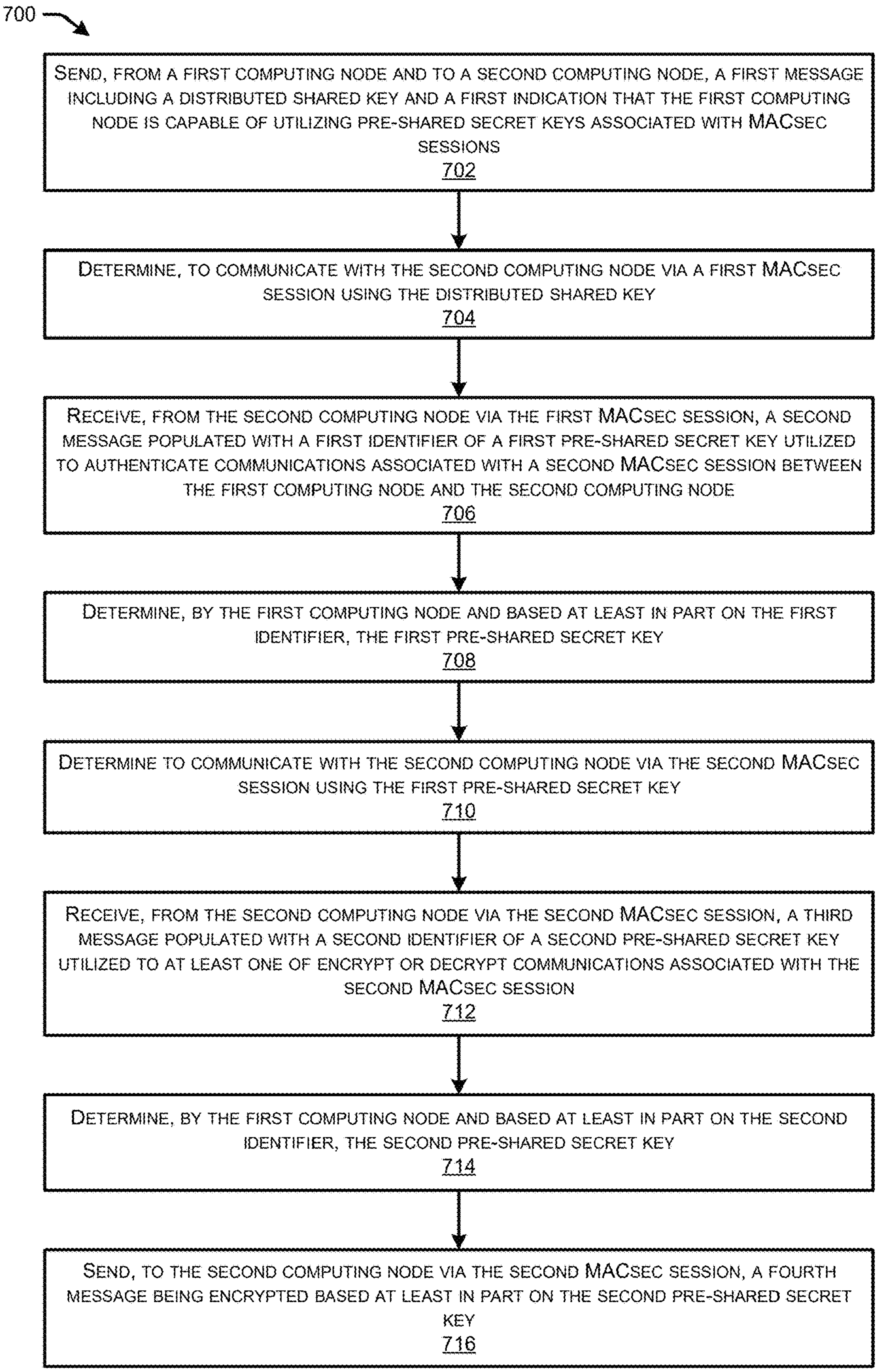
FIG. 7 illustrates a flow diagram of an example method for utilizing post-quantum pre-shared key (PPK) identifiers to establish encrypted MACsec traffic sessions as described herein.

FIGS. 6 and 7 illustrate flow diagrams of example methods 600 and 700 and that illustrate aspects of the functions performed at least partly by the QKD service 102 and/or by the respective components within as described in FIG. 1. The logical operations described herein with respect to FIGS. 6 and 7 may be implemented (1) as a sequence of computer-implemented acts or program modules running on a computing system and/or (2) as interconnected machine logic circuits or circuit modules within the computing system. In some examples, the method(s) 600 and 700 may be performed by a system comprising one or more processors and one or more non-transitory computer-readable media storing computer-executable instructions that, when executed by the one or more processors, cause the one or more processors to perform the method(s) 600 and 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for distributing post-quantum pre-shared key (PPK) identifiers utilized to establish encrypted MACsec traffic sessions as described herein.

At 602, the method 600 may include determining, by a first computing node, to communicate with a second computing node via a first MACsec session based at least in part on receiving a first message from the second computing node including a distributed shared key and/or a first indication that the second computing node is capable of utilizing pre-shared secret keys associated with MACsec sessions. In some examples, the first computing node may correspond to the first station 104(1) and/or the key server 402, as described with respect to FIGS. 1 and 4. Additionally, or alternatively, the second computing node may correspond to the second station 104(N) and/or the non-key server 404, as described with respect to FIGS. 1 and 4. Additionally, or alternatively, the determining may be based at least in part on the first computing node and the second computing node exchanging MKA announcement messages.

At 604, the method 600 may include determining a first pre-shared secret key utilized to authenticate communications associated with a second MACsec session between the first computing node and the second computing node. In some examples, determining the first pre-shared secret key may be based at least in part on the distributed shared key.

At 606, the method 600 may include sending, to the second computing node via the first MACsec session, the second message populated with at least a first identifier associated with the first pre-shared secret key. In some examples, the second message may be configured as a PPK parameter set 300, as described with respect to FIG. 3.

At 608, the method 600 may include establishing a second MACsec session between the first computing node and the second computing node based at least in part on the first pre-shared secret key.

At 610, the method 600 may include determining a second pre-shared secret key utilized to at least one of encrypt or decrypt communications associated with the second MACsec session. In some examples, determining the second pre-shared secret key may be based at least in part on the first pre-shared secret key.

At 612, the method 600 may include sending, to the second computing node via the second MACsec session, a fifth message populated with a second identifier associated with the second pre-shared secret key. In some examples, the fifth message may be configured as a PPK parameter set 300, as described with respect to FIG. 3.

At 614, the method 600 may include receiving, from the second computing node via the second MACsec session, a sixth message being encrypted with the second pre-shared secret key.

In some examples, the first message may further include a second indication of a type of the pre-shared secret keys that the first computing node is capable of utilizing in association with the MACsec sessions. Additionally, or alternatively, the type may indicate one of a connectivity association key (CAK) or a secure association key (SAK).

In some examples, the first pre-shared secret key may be a connectivity association key (CAK) and/or the second pre-shared secret key may be a secure association key (SAK).

In some examples, determining the pre-shared secret keys associated with the MACsec sessions may comprise receiving the pre-shared secret keys from a quantum key distribution (QKD) service.

Additionally, or alternatively, the method 600 may include determining that a rollover event associated with the first pre-shared secret key has occurred. Additionally, or alternatively, the method 600 may include determining, based at least in part on the first pre-shared secret key, a third pre-shared secret key utilized to authenticate communications associated with a third MACsec session between the first computing node and the second computing node. Additionally, or alternatively, the method 600 may include encrypting a seventh message using the second pre-shared secret key, the seventh message including a seventh portion populated with a third identifier associated with the third pre-shared secret key utilized to authenticate the communications associated with the third MACsec session. Additionally, or alternatively, the method 600 may include sending, to the second computing node via the second MACsec session, the seventh message based on the first pre-shared secret key. Additionally, or alternatively, the method 600 may include determining to communicate with the second computing node via the third MACsec session based at least in part on the third pre-shared secret key. Additionally, or alternatively, the method 600 may include determining, based at least in part on the third pre-shared secret key, a fourth pre-shared secret key utilized to at least one of encrypt or decrypt the communications associated with the third MACsec session. Additionally, or alternatively, the method 600 may include sending, to the second computing node via the third MACsec session, an eighth message including an eighth portion populated with a fourth identifier associated with the fourth pre-shared secret key. Additionally, or alternatively, the method 600 may include receiving, from the second computing node via the third MACsec session, a ninth message encrypted based at least in part on the fourth pre-shared secret key.

In some examples, the rollover event may be based at least in part on at least one of an expiration of a period of time associated with the first pre-shared secret key, a security breach associated with at least one of the first pre-shared secret key or the second MACsec session, a configuration change associated with at least one of the first computing node or the second computing node, and/or an indication that at least one of the first computing node or the second computing node is at least one of restarting or booting up.

FIG. 7 illustrates a flow diagram of an example method 700 for utilizing post-quantum pre-shared key (PPK) identifiers to establish encrypted MACsec traffic sessions as described herein.

At 702, the method 700 may include sending, from a first computing node and to a second computing node, a first message including a distributed shared key and a first indication that the first computing node is capable of utilizing pre-shared secret keys associated with MACsec sessions. In some examples, the first computing node may correspond to the second station 104(N) and/or the non-key server 402, as described with respect to FIGS. 1 and 4. Additionally, or alternatively, the second computing node may correspond to the first station 104(1) and/or the key server 402, as described with respect to FIGS. 1 and 4. Additionally, or alternatively, the determining may be based at least in part on the first computing node and the second computing node exchanging MKA announcement messages.

At 704, the method 700 may include determining to communicate with the second computing node via a first MACsec session using the distributed shared key.

At 706, the method 700 may include receiving, from the second computing node via the first MACsec session, a second message populated with a first identifier of a first pre-shared secret key utilized to authenticate communications associated with a second MACsec session between the first computing node and the second computing node. In some examples, the second message may be configured as a PPK parameter set 300, as described with respect to FIG. 3.

At 708, the method 700 may include determining, by the first computing node and based at least in part on the first identifier, the first pre-shared secret key.

At 710, the method 700 may include determining to communicate with the second computing node via the second MACsec session using the first pre-shared secret key.

At 712, the method 700 may include receiving, from the second computing node via the second MACsec session, a third message populated with a second identifier of a second pre-shared secret key utilized to at least one of encrypt or decrypt communications associated with the second MACsec session. In some examples, the third message may be configured as a PPK parameter set 300, as described with respect to FIG. 3.

At 714, the method 700 may include determining, by the first computing node and based at least in part on the second identifier, the second pre-shared secret key.

At 716, the method 700 may include sending, to the second computing node via the second MACsec session, a fourth message being encrypted based at least in part on the second pre-shared secret key.

In some examples, the first message may include a second indication of a type of the pre-shared secret keys that the first computing node is capable of utilizing in association with the MACsec sessions. Additionally, or alternatively, the type may indicate one of a connectivity association key (CAK) or a secure association key (SAK).

In some examples, the first pre-shared secret key may be a connectivity association key (CAK) and/or the second pre-shared secret key may be a secure association key (SAK).

In some examples, determining the pre-shared secret keys associated with the MACsec sessions may comprise receiving the pre-shared secret keys from a quantum key distribution (QKD) service based at least in part on an associated identifier.

Additionally, or alternatively, the method 700 may include receiving, from a third computing node, a fifth message including the distributed shared key and a second indication that the third computing node is capable of utilizing the pre-shared secret keys associated with the MACsec sessions. Additionally, or alternatively, the method 700 may include sending, to the third computing node, a sixth message including the distributed shared key and the first indication that the first computing node is capable of utilizing the pre-shared secret keys associated with the MACsec sessions. Additionally, or alternatively, the method 700 may include determining to communicate with the third computing node via a third MACsec session using the distributed shared key. Additionally, or alternatively, the method 700 may include receiving, from the third computing node via the third MACsec session, a seventh message populated with the first identifier of the first pre-shared secret key utilized to authenticate communications associated with a fourth MACsec session between the first computing node and the third computing node. Additionally, or alternatively, the method 700 may include determining to communicate with the second computing node via the fourth MACsec session using the first pre-shared secret key. Additionally, or alternatively, the method 700 may include receiving, from the third computing node via the fourth MACsec session, an eighth message populated with a third identifier of a third pre-shared secret key, the third pre-shared key being utilized to at least one of encrypt or decrypt communications associated with the fourth MACsec session. Additionally, or alternatively, the method 700 may include determining, by the first computing node and based at least in part on the third identifier, the third pre-shared secret key. Additionally, or alternatively, the method 700 may include sending, to the third computing node via the fourth MACsec session, a ninth message being encrypted based at least in part on the third pre-shared secret key.

Additionally, or alternatively, the method 700 may include determining that a rollover event associated with the first pre-shared secret key has occurred. Additionally, or alternatively, the method 700 may include receiving, from the second computing node via the second MACsec session, a fifth message being encrypted based at least in part on the second pre-shared secret key. Additionally, or alternatively, the method 700 may include decrypting the fifth message based at least in part on the second pre-shared secret key to generate a decrypted fifth message, the decrypted fifth message including a fifth portion populated with a third identifier associated with the third pre-shared secret key utilized to authenticate the communications associated with the third MACsec session. Additionally, or alternatively, the method 700 may include determining the third-pre shared secret key based at least in part on the third identifier. Additionally, or alternatively, the method 700 may include determining to communicate with the second computing node via the third MACsec session based at least in part on the third pre-shared secret key. Additionally, or alternatively, the method 700 may include receiving, from the second computing node via the third MACsec session, a sixth message including a fourth identifier associated with a fourth pre-shared secret key utilized to at least one of encrypt or decrypt the communications associated with the third MACsec session. Additionally, or alternatively, the method 700 may include determining the fourth pre-shared secret key based at least in part on the fourth identifier. Additionally, or alternatively, the method 700 may include sending, to the second computing node via the third MACsec session, a seventh message encrypted based at least in part on the fourth pre-shared secret key.

In some examples, the rollover event may be based at least in part on at least one of an expiration of a period of time associated with the first pre-shared secret key, a security breach associated with at least one of the first pre-shared secret key or the second MACsec session, a configuration change associated with at least one of the first computing node or the second computing node, and/or an indication that at least one of the first computing node or the second computing node is at least one of restarting or booting up.

Figure 8:
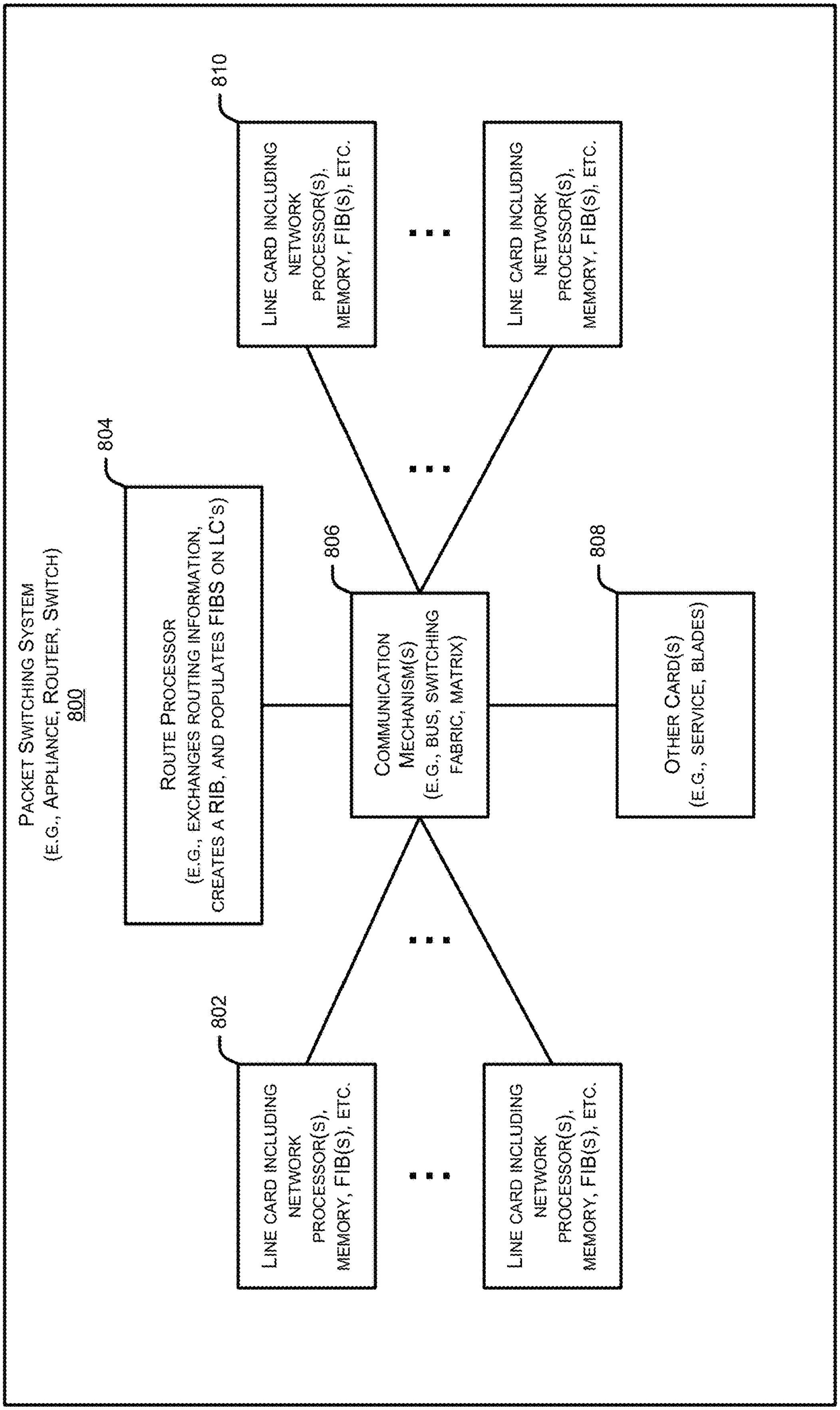
FIG. 8 illustrates a block diagram illustrating an example packet switching system that can be utilized to implement various aspects of the technologies disclosed herein.

FIG. 8 illustrates a block diagram illustrating an example packet switching device (or system) 800 that can be utilized to implement various aspects of the technologies disclosed herein. In some examples, packet switching device(s) 800 may be employed in various networks, such as, for example, the QKD service 102, the stations 104, and/or the service provider network 108, as described with respect to FIG. 1.

In some examples, a packet switching device 800 may comprise multiple line card(s) 802, 810, each with one or more network interfaces for sending and receiving packets over communications links (e.g., possibly part of a link aggregation group). The packet switching device 800 may also have a control plane with one or more processing elements 804 for managing the control plane and/or control plane processing of packets associated with forwarding of packets in a network. The packet switching device 800 may also include other cards 808 (e.g., service cards, blades) which include processing elements that are used to process (e.g., forward/send, drop, manipulate, change, modify, receive, create, duplicate, apply a service) packets associated with forwarding of packets in a network. The packet switching device 800 may comprise hardware-based communication mechanism 806 (e.g., bus, switching fabric, and/or matrix, etc.) for allowing its different card(s) 802, 808, and 810 and one or more processing elements 804 to communicate. Line card(s) 802, 810 may typically perform the actions of being both an ingress and/or an egress line card 802, 810, in regard to multiple other particular packets and/or packet streams being received by, or sent from, packet switching device 800.

Figure 9:
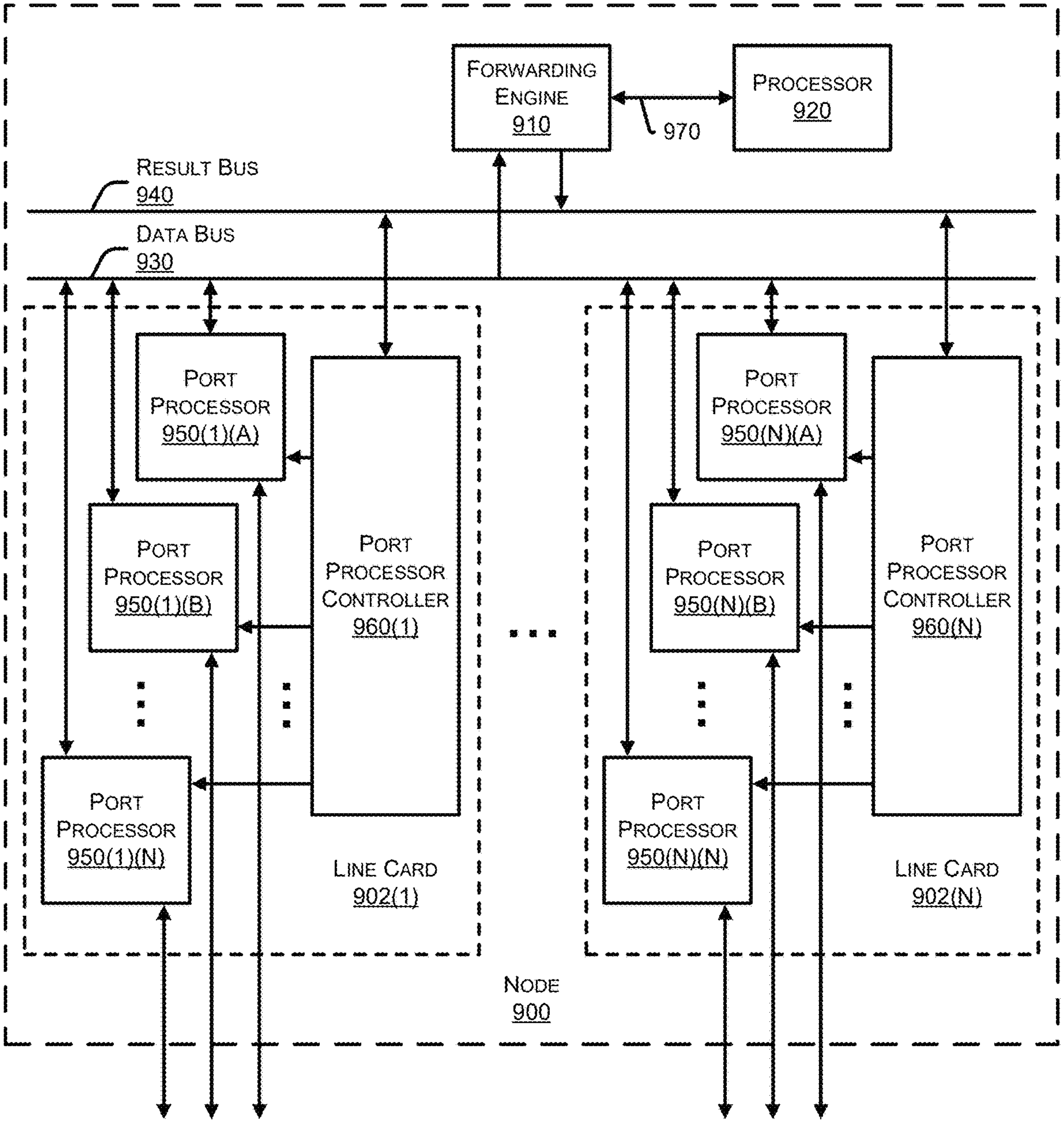
FIG. 9 illustrates a block diagram illustrating certain components of an example node that can be utilized to implement various aspects of the technologies disclosed herein.

FIG. 9 illustrates a block diagram illustrating certain components of an example node 900 that can be utilized to implement various aspects of the technologies disclosed herein. In some examples, node(s) 900 may be employed in various networks, such as, for example, the QKD service 102, the stations 104, and/or the service provider network 108, as described with respect to FIG. 1.

In some examples, node 900 may include any number of line cards 902 (e.g., line cards 902(1)-(N), where N may be any integer greater than 1) that are communicatively coupled to a forwarding engine 910 (also referred to as a packet forwarder) and/or a processor 920 via a data bus 930 and/or a result bus 940. Line cards 902(1)-(N) may include any number of port processors 950(1)(A)-(N)(N) which are controlled by port processor controllers 960(1)-(N), where N may be any integer greater than 1. Additionally, or alternatively, forwarding engine 910 and/or processor 920 are not only coupled to one another via the data bus 930 and the result bus 940, but may also communicatively coupled to one another by a communications link 970.

The processors (e.g., the port processor(s) 950 and/or the port processor controller(s) 960) of each line card 902 may be mounted on a single printed circuit board. When a packet or packet and header are received, the packet or packet and header may be identified and analyzed by node 900 (also referred to herein as a router) in the following manner. Upon receipt, a packet (or some or all of its control information) or packet and header may be sent from one of port processor(s) 950(1)(A)-(N)(N) at which the packet or packet and header was received and to one or more of those devices coupled to the data bus 930 (e.g., others of the port processor(s) 950(1)(A)-(N)(N), the forwarding engine 910 and/or the processor 920). Handling of the packet or packet and header may be determined, for example, by the forwarding engine 910. For example, the forwarding engine 910 may determine that the packet or packet and header should be forwarded to one or more of port processors 950(1)(A)-(N)(N). This may be accomplished by indicating to corresponding one(s) of port processor controllers 960(1)-(N) that the copy of the packet or packet and header held in the given one(s) of port processor(s) 950(1)(A)-(N)(N) should be forwarded to the appropriate one of port processor(s) 950(1)(A)-(N)(N). Additionally, or alternatively, once a packet or packet and header has been identified for processing, the forwarding engine 910, the processor 920, and/or the like may be used to process the packet or packet and header in some manner and/or maty add packet security information in order to secure the packet. On a node 900 sourcing such a packet or packet and header, this processing may include, for example, encryption of some or all of the packet's or packet and header's information, the addition of a digital signature, and/or some other information and/or processing capable of securing the packet or packet and header. On a node 900 receiving such a processed packet or packet and header, the corresponding process may be performed to recover or validate the packet's or packet and header's information that has been secured.

Figure 10:
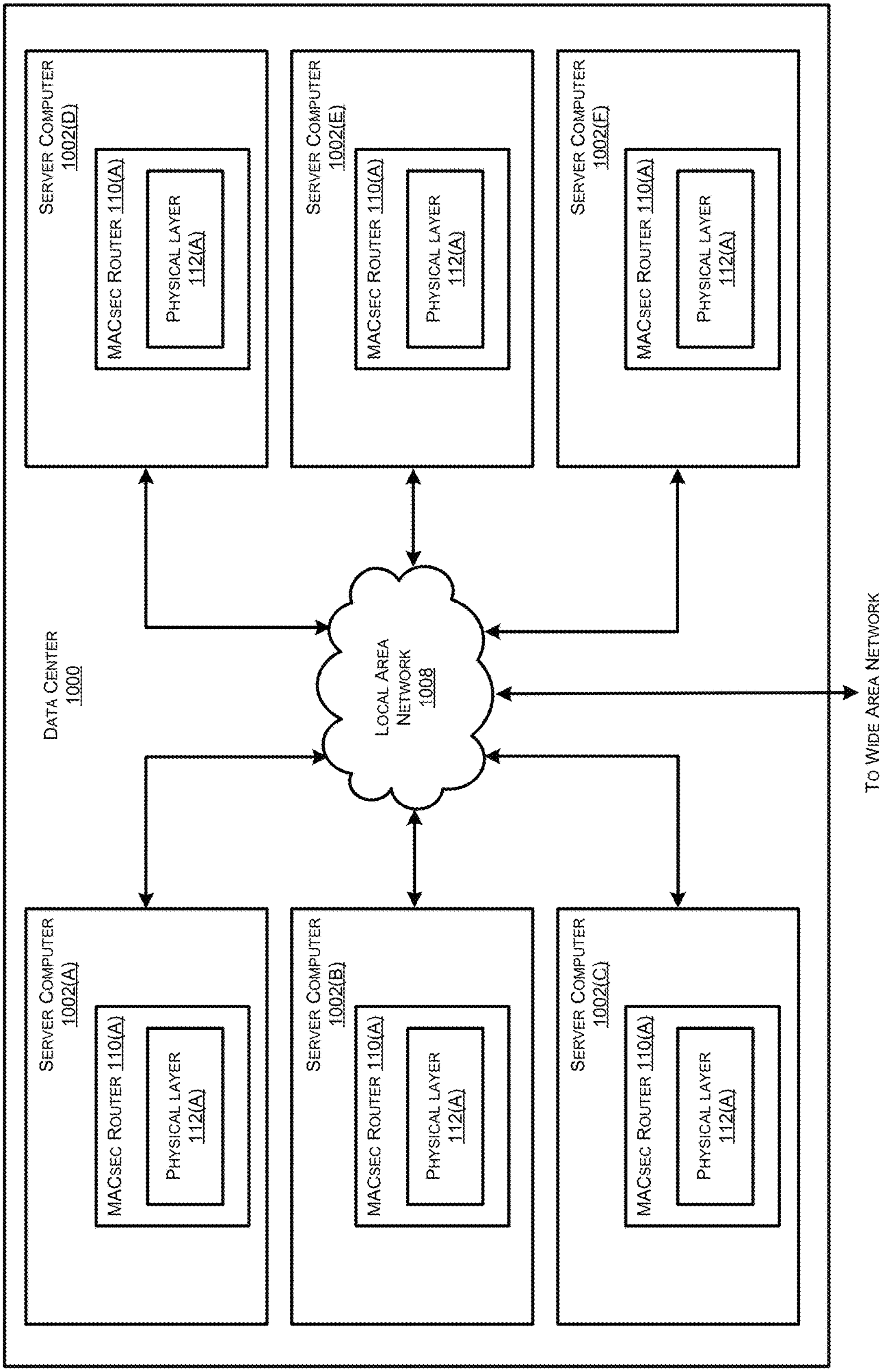
FIG. 10 illustrates a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002E (which might be referred to herein singularly as "a server computer 1002" or in the plural as "the server computers 1002") for providing computing resources. In some examples, the server computers 1002 may include, or correspond to, the servers associated with the QKD service 102, the stations 104, and/or the service provider network 108, as described with respect to FIG. 1.

The server computers 1002 can be standard tower, rack-mount, or blade server computers configured appropriately for providing the computing resources described herein. As mentioned above, the computing resources provided by the QKD service 102, the stations 104, and/or the service provider network 108 can be data processing resources such as VM instances or hardware computing systems, database clusters, computing clusters, storage clusters, data storage resources, database resources, networking resources, and others. Some of the server computers 1002 can also be configured to execute a resource manager capable of instantiating and/or managing the computing resources. In the case of VM instances, for example, the resource manager can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002E in each data center 1000, and, potentially, between computing resources in each of the server computers 1002. It should be appreciated that the configuration of the data center 1000 described with reference to FIG. 10 is merely illustrative and that other implementations can be utilized.

In some examples, the server computers 1002 may each execute MACsec router 110 including a physical layer 112 utilized to establish MACsec secure session(s) 122 with one or more additional MACsec routers 110.

In some instances, the QKD service 102, the stations 104, and/or the service provider network 108, may provide computing resources, like application containers, VM instances, and storage, on a permanent or an as-needed basis. Among other types of functionality, the computing resources provided by the QKD service 102, the stations 104, and/or the service provider network 108, may be utilized to implement the various services described above. The computing resources provided by the QKD service 102, the stations 104, and/or the service provider network 108, can include various types of computing resources, such as data processing resources like application containers and VM instances, data storage resources, networking resources, data communication resources, network services, and the like.

Each type of computing resource provided by the QKD service 102, the stations 104, and/or the service provider network 108, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The QKD service 102, the stations 104, and/or the service provider network 108, can also be configured to provide other types of computing resources not mentioned specifically herein.

The computing resources provided by the QKD service 102, the stations 104, and/or the service provider network 108, may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

Figure 11:
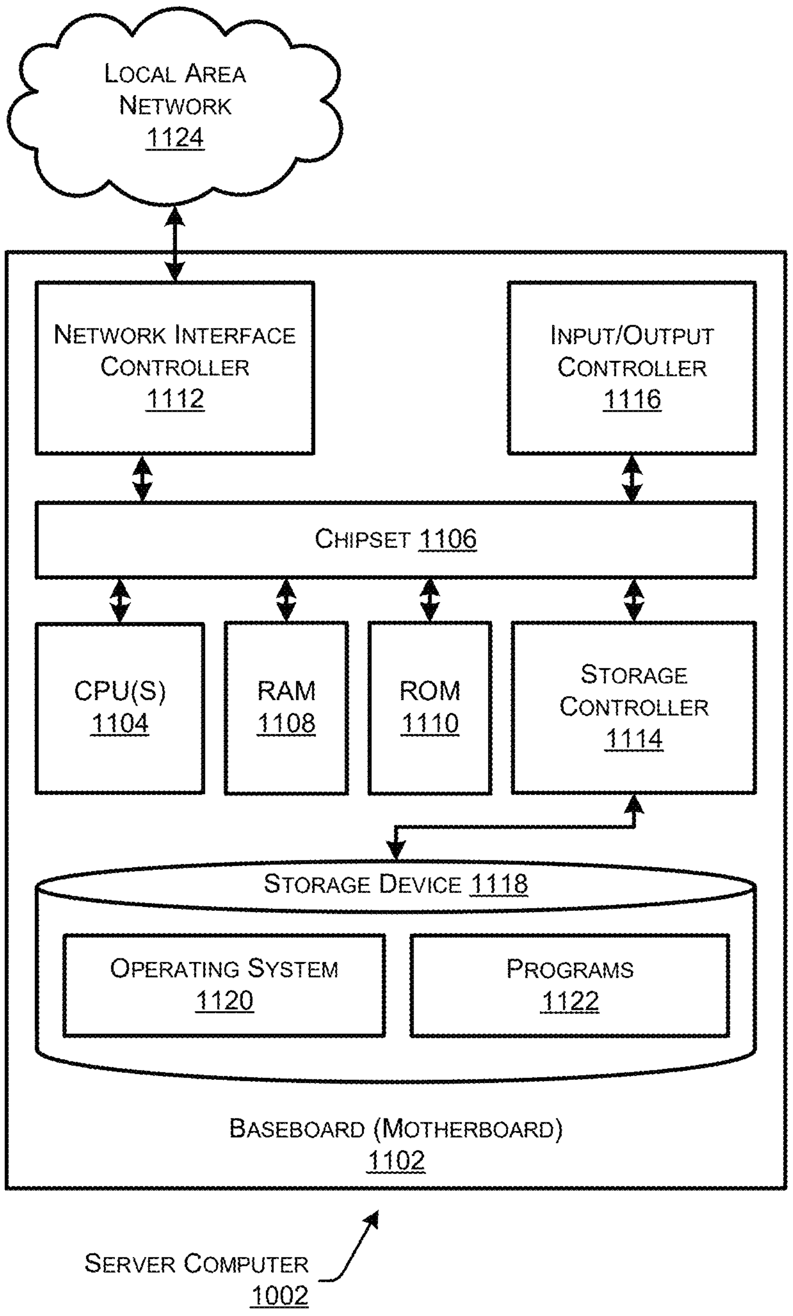
FIG. 11 is a computer architecture diagram showing an illustrative computer hardware architecture for implementing a server device that can be utilized to implement aspects of the various technologies presented herein.

FIG. 11 shows an example computer architecture for a server computer (or computing device/network routing device) 1002 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The server computer 1002 may, in some examples, correspond to a physical server of the QKD service 102, the stations 104, and/or the service provider network 108, as described herein with respect to FIG. 1.

The server computer 1002 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the server computer 1002.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the server computer 1002. The chipset 1106 can further provide an interface to a computer-readable storage medium such as a read-only memory ("ROM") 1110 or non-volatile RAM ("NVRAM") for storing basic routines that help to startup the server computer 1002 and to transfer information between the various components and devices. The ROM 1110 or NVRAM can also store other software components necessary for the operation of the server computer 1002 in accordance with the configurations described herein.

The server computer 1002 can operate in a networked environment using logical connections to remote computing devices and computer systems through a network, such as the network 1124 (or 1008). The chipset 1106 can include functionality for providing network connectivity through a NIC 1112, such as a gigabit Ethernet adapter. The NIC 1112 is capable of connecting the server computer 1002 to other computing devices over the network 1124. It should be appreciated that multiple NICs 1112 can be present in the server computer 1002, connecting the computer to other types of networks and remote computer systems.

The server computer 1002 can be connected to a storage device 1118 that provides non-volatile storage for the server computer 1002. The storage device 1118 can store an operating system 1120, programs 1122, and data, which have been described in greater detail herein. The storage device 1118 can be connected to the server computer 1002 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 1002 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the server computer 1002 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 1002 can further read information from the storage device 1118 by detecting the physical states or characteristics of one or more particular locations within the physical storage units.

In addition to the mass storage device 1118 described above, the server computer 1002 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 1002. In some examples, the operations performed by the QKD service 102, the stations 104, and/or the service provider network 108, and or any components included therein, may be supported by one or more devices similar to server computer 1002. Stated otherwise, some or all of the operations performed by the QKD service 102, the stations 104, and/or the service provider network 108, and or any components included therein, may be performed by one or more server computer 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the server computer 1002. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the server computer 1002.

In one embodiment, the storage device 1118 or other computer-readable storage media is encoded with computer-executable instructions which, when loaded into the server computer 1002, transform the computer from a general-purpose computing system into a special-purpose computer capable of implementing the embodiments described herein. These computer-executable instructions transform the server computer 1002 by specifying how the CPUs 1104 transition between states, as described above. According to one embodiment, the server computer 1002 has access to computer-readable storage media storing computer-executable instructions which, when executed by the server computer 1002, perform the various processes described above with regard to FIGS. 4-7. The server computer 1002 can also include computer-readable storage media having instructions stored thereupon for performing any of the other computer-implemented operations described herein.

The server computer 1002 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the server computer 1002 might not include all of the components shown in FIG. 11, can include other components that are not explicitly shown in FIG. 11, or might utilize an architecture completely different than that shown in FIG. 11.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:

one or more processors; and one or more computer-readable media storing computer-executable instructions that, when executed by the one or more processors, cause the one or more processors to perform operations comprising:

sending, from a first computing node and to a second computing node, a first message comprising a first MACsec key agreement (MKA) announcement including a first portion populated with a first indication that the first computing node is capable of utilizing pre-shared secret keys associated with MACsec sessions and a second portion populated with a distributed shared key;

receiving, from the second computing node, a second message comprising a second MKA announcement including a third portion populated with a second indication that the second computing node is capable of utilizing the pre-shared secret keys associated with the MACsec sessions and a fourth portion populated with the distributed shared key;

determining to communicate with the second computing node via a first MACsec session based at least in part on the distributed shared key;

determining, based at least in part on the distributed shared key, a first pre-shared secret key utilized to authenticate communications associated with a second MACsec session between the first computing node and the second computing node;

sending, to the second computing node via the first MACsec session, a third message including a fifth portion populated with a first identifier associated with the first pre-shared secret key;

determining to communicate with the second computing node via the second MACsec session based at least in part on the first pre-shared secret key;

determining, based at least in part on the first pre-shared secret key, a second pre-shared secret key utilized to at least one of encrypt or decrypt communications associated with the second MACsec session;

sending, to the second computing node via the second MACsec session, a fifth message including a sixth portion populated with a second identifier associated with the second pre-shared secret key; and receiving, from the second computing node via the second MACsec session, a sixth message being encrypted based at least in part on the second pre-shared secret key.

2. The system of claim 1, wherein the first MKA announcement further includes a third indication of a type of the pre-shared secret keys that the first computing node is capable of utilizing in association with the MACsec sessions, wherein the type indicates one of a connectivity association key (CAK) or a secure association key (SAK).

3. The system of claim 1, the operations further comprising:

determining that a rollover event associated with the first pre-shared secret key has occurred;

determining, based at least in part on the first pre-shared secret key, a third pre-shared secret key utilized to authenticate communications associated with a third MACsec session between the first computing node and the second computing node;

encrypting a seventh message using the second pre-shared secret key, the seventh message including a seventh portion populated with a third identifier associated with the third pre-shared secret key utilized to authenticate the communications associated with the third MACsec session;

sending, to the second computing node via the second MACsec session, the seventh message based on the first pre-shared secret key; and determining to communicate with the second computing node via the third MACsec session based at least in part on the third pre-shared secret key.

4. The system of claim 3, the operations further comprising:

determining, based at least in part on the third pre-shared secret key, a fourth pre-shared secret key utilized to at least one of encrypt or decrypt the communications associated with the third MACsec session;

sending, to the second computing node via the third MACsec session, an eighth message including an eighth portion populated with a fourth identifier associated with the fourth pre-shared secret key; and receiving, from the second computing node via the third MACsec session, a ninth message encrypted based at least in part on the fourth pre-shared secret key.

5. The system of claim 3, wherein the rollover event is based at least in part on at least one of:

an expiration of a period of time associated with the first pre-shared secret key;

a security breach associated with at least one of the first pre-shared secret key or the second MACsec session;

a configuration change associated with at least one of the first computing node or the second computing node; or an indication that at least one of the first computing node or the second computing node is at least one of restarting or booting up.

6. The system of claim 1, wherein the first pre-shared secret key is a connectivity association key (CAK) and the second pre-shared secret key is a secure association key (SAK).

7. The system of claim 1, wherein determining the pre-shared secret keys associated with the MACsec sessions comprises receiving the pre-shared secret keys from a quantum key distribution (QKD) service.

8. A method comprising:

determining, by a first computing node, to communicate with a second computing node via a first MACsec session based at least in part on receiving a first message from the second computing node including a distributed shared key and a first indication that the second computing node is capable of utilizing pre-shared secret keys associated with MACsec sessions;

determining, based at least in part on the distributed shared key, a first pre-shared secret key utilized to authenticate communications associated with a second MACsec session between the first computing node and the second computing node;

sending, to the second computing node via the first MACsec session, a second message populated with at least a first identifier associated with the first pre-shared secret key;

establishing a second MACsec session between the first computing node and the second computing node based at least in part on the first pre-shared secret key;

determining, based at least in part on the first pre-shared secret key, a second pre-shared secret key utilized to at least one of encrypt or decrypt communications associated with the second MACsec session;

sending, to the second computing node via the second MACsec session, a fifth message populated with a second identifier associated with the second pre-shared secret key; and receiving, from the second computing node via the second MACsec session, a sixth message being encrypted with the second pre-shared secret key.

9. The method of claim 8, wherein the first message further includes a second indication of a type of the pre-shared secret keys that the first computing node is capable of utilizing in association with the MACsec sessions, and the type indicates one of a connectivity association key (CAK) or a secure association key (SAK).

10. The method of claim 8, wherein the first pre-shared secret key is a connectivity association key (CAK) and the second pre-shared secret key is a secure association key (SAK).

11. The method of claim 8, wherein determining the pre-shared secret keys associated with the MACsec sessions comprises receiving the pre-shared secret keys from a quantum key distribution (QKD) service.

12. The method of claim 8, further comprising:

determining that a rollover event associated with the first pre-shared secret key has occurred;

determining, based at least in part on the first pre-shared secret key, a third pre-shared secret key utilized to authenticate communications associated with a third MACsec session between the first computing node and the second computing node;

encrypting a seventh message using the second pre-shared secret key, the seventh message including a seventh portion populated with a third identifier associated with the third pre-shared secret key utilized to authenticate the communications associated with the third MACsec session;

sending, to the second computing node via the second MACsec session, the seventh message based on the first pre-shared secret key;

determining to communicate with the second computing node via the third MACsec session based at least in part on the third pre-shared secret key;

determining, based at least in part on the third pre-shared secret key, a fourth pre-shared secret key utilized to at least one of encrypt or decrypt the communications associated with the third MACsec session;

sending, to the second computing node via the third MACsec session, an eighth message including an eighth portion populated with a fourth identifier associated with the fourth pre-shared secret key; and receiving, from the second computing node via the third MACsec session, a ninth message encrypted based at least in part on the fourth pre-shared secret key.

13. The method of claim 12, wherein the rollover event is based at least in part on at least one of:

an expiration of a period of time associated with the first pre-shared secret key;

a security breach associated with at least one of the first pre-shared secret key or the second MACsec session;

a configuration change associated with at least one of the first computing node or the second computing node; or an indication that at least one of the first computing node or the second computing node is at least one of restarting or booting up.

14. A system comprising:

one or more processors; and one or more computer-readable media storing computer-executable instructions that, when executed by the one or more processors, cause the one or more processors to perform operations comprising:

sending, from a first computing node and to a second computing node, a first message including a distributed shared key and a first indication that the first computing node is capable of utilizing pre-shared secret keys associated with MACsec sessions;

determining to communicate with the second computing node via a first MACsec session using the distributed shared key;

receiving, from the second computing node via the first MACsec session, a second message populated with a first identifier of a first pre-shared secret key utilized to authenticate communications associated with a second MACsec session between the first computing node and the second computing node;

determining, by the first computing node and based at least in part on the first identifier, the first pre-shared secret key;

determining to communicate with the second computing node via the second MACsec session using the first pre-shared secret key;

receiving, from the second computing node via the second MACsec session, a third message populated with a second identifier of a second pre-shared secret key utilized to at least one of encrypt or decrypt communications associated with the second MACsec session;

determining, by the first computing node and based at least in part on the second identifier, the second pre-shared secret key; and sending, to the second computing node via the second MACsec session, a fourth message being encrypted based at least in part on the second pre-shared secret key.

15. The system of claim 14, wherein the first message further includes a second indication of a type of the pre-shared secret keys that the first computing node is capable of utilizing in association with the MACsec sessions, and the type indicates one of a connectivity association key (CAK) or a secure association key (SAK).

16. The system of claim 14, wherein the first pre-shared secret key is a connectivity association key (CAK) and the second pre-shared secret key is a secure association key (SAK).

17. The system of claim 14, wherein determining the pre-shared secret keys associated with the MACsec sessions comprises receiving the pre-shared secret keys from a quantum key distribution (QKD) service based at least in part on an associated identifier.

18. The system of claim 14, the operations further comprising:

receiving, from a third computing node, a fifth message including the distributed shared key and a second indication that the third computing node is capable of utilizing the pre-shared secret keys associated with the MACsec sessions;

sending, to the third computing node, a sixth message including the distributed shared key and the first indication that the first computing node is capable of utilizing the pre-shared secret keys associated with the MACsec sessions;

determining to communicate with the third computing node via a third MACsec session using the distributed shared key;

receiving, from the third computing node via the third MACsec session, a seventh message populated with the first identifier of the first pre-shared secret key utilized to authenticate communications associated with a fourth MACsec session between the first computing node and the third computing node;

determining to communicate with the second computing node via the fourth MACsec session using the first pre-shared secret key;

receiving, from the third computing node via the fourth MACsec session, an eighth message populated with a third identifier of a third pre-shared secret key, the third pre-shared secret key being utilized to at least one of encrypt or decrypt communications associated with the fourth MACsec session;

determining, by the first computing node and based at least in part on the third identifier, the third pre-shared secret key; and sending, to the third computing node via the fourth MACsec session, a ninth message being encrypted based at least in part on the third pre-shared secret key.

19. The system of claim 14, the operations further comprising:

determining that a rollover event associated with the first pre-shared secret key has occurred;

receiving, from the second computing node via the second MACsec session, a fifth message being encrypted based at least in part on the second pre-shared secret key;

decrypting the fifth message based at least in part on the second pre-shared secret key to generate a decrypted fifth message, the decrypted fifth message including a fifth portion populated with a third identifier associated with a third pre-shared secret key utilized to authenticate the communications associated with a third MACsec session;

determining a third-pre shared secret key based at least in part on the third identifier;

determining to communicate with the second computing node via the third MACsec session based at least in part on the third pre-shared secret key;

receiving, from the second computing node via the third MACsec session, a sixth message including a fourth identifier associated with a fourth pre-shared secret key utilized to at least one of encrypt or decrypt the communications associated with the third MACsec session;

determining the fourth pre-shared secret key based at least in part on the fourth identifier; and sending, to the second computing node via the third MACsec session, a seventh message encrypted based at least in part on the fourth pre-shared secret key.

20. The system of claim 19, wherein the rollover event is based at least in part on at least one of:

an expiration of a period of time associated with the first pre-shared secret key;

a security breach associated with at least one of the first pre-shared secret key or the second MACsec session;

a configuration change associated with at least one of the first computing node or the second computing node; or an indication that at least one of the first computing node or the second computing node is at least one of restarting or booting up.

* * * * *